(12) United States Patent
Nimura et al.

(10) Patent No.: US 8,696,451 B2
(45) Date of Patent: Apr. 15, 2014

(54) IMAGE GENERATION SYSTEM, IMAGE GENERATION METHOD, AND INFORMATION STORAGE MEDIUM

(75) Inventors: Shinobu Nimura, Yokohama (JP); Tetsukazu Nakanishi, Saitama (JP)

(73) Assignee: Namco Bandai Games Inc., Tokyo (JP)

( * ) Notice: Subject to any disclaimer, the term of this patent is extended or adjusted under 35 U.S.C. 154(b) by 163 days.

(21) Appl. No.: 13/074,498

(22) Filed: Mar. 29, 2011

(65) Prior Publication Data
US 2011/0244958 A1    Oct. 6, 2011

(30) Foreign Application Priority Data
Mar. 31, 2010    (JP) ................................ 2010-083889

(51) Int. Cl.
*A63F 9/00*     (2006.01)
*A63F 13/00*    (2006.01)
*G06F 17/00*    (2006.01)
*G06F 19/00*    (2011.01)

(52) U.S. Cl.
USPC ........................................................ 463/31

(58) Field of Classification Search
USPC ........................................................ 463/31
See application file for complete search history.

(56) References Cited

U.S. PATENT DOCUMENTS

| | | | | |
|---|---|---|---|---|
| 6,354,944 | B1* | 3/2002 | Takahashi et al. | 463/32 |
| 2001/0035906 | A1* | 11/2001 | Fukuda | 348/169 |
| 2007/0270215 | A1* | 11/2007 | Miyamoto et al. | 463/32 |
| 2009/0117969 | A1* | 5/2009 | Englman | 463/20 |
| 2010/0247088 | A1* | 9/2010 | Campbell et al. | 396/325 |

FOREIGN PATENT DOCUMENTS

| | | |
|---|---|---|
| JP | A-2003-107603 | 4/2003 |
| JP | A-2004-126902 | 4/2004 |
| JP | A-2004-328566 | 11/2004 |
| JP | A-2011-183070 | 9/2011 |

* cited by examiner

*Primary Examiner* — Omkar Deodhar
*Assistant Examiner* — Reginald Renwick
(74) *Attorney, Agent, or Firm* — Oliff PLC

(57) ABSTRACT

An image generation system includes an object space setting section, a character control section, a virtual camera control section, an inter-camera distance setting section that sets an inter-camera distance based on at least one of position information, direction information, and moving state information about the character or the virtual camera, the inter-camera distance being a distance between a left-eye virtual camera and a right-eye virtual camera for generating a stereoscopic image, and an image generation section that generates a left-eye image and a right-eye image, the left-eye image being an image viewed from the left-eye virtual camera in an object space, and the right-eye image being an image viewed from the right-eye virtual camera in the object space.

20 Claims, 20 Drawing Sheets

FIG. 3A
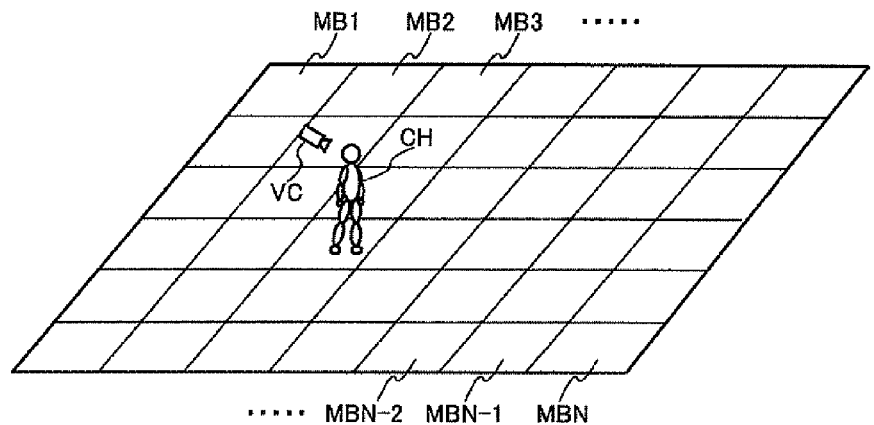
FIG. 3B
| X1, Z1 | H1 |
| X2, Z2 | H2 |
| X3, Z3 | H3 |
| X4, Z4 | H4 |
| ⋮ | ⋮ |
FIG. 3C          FIG. 3D
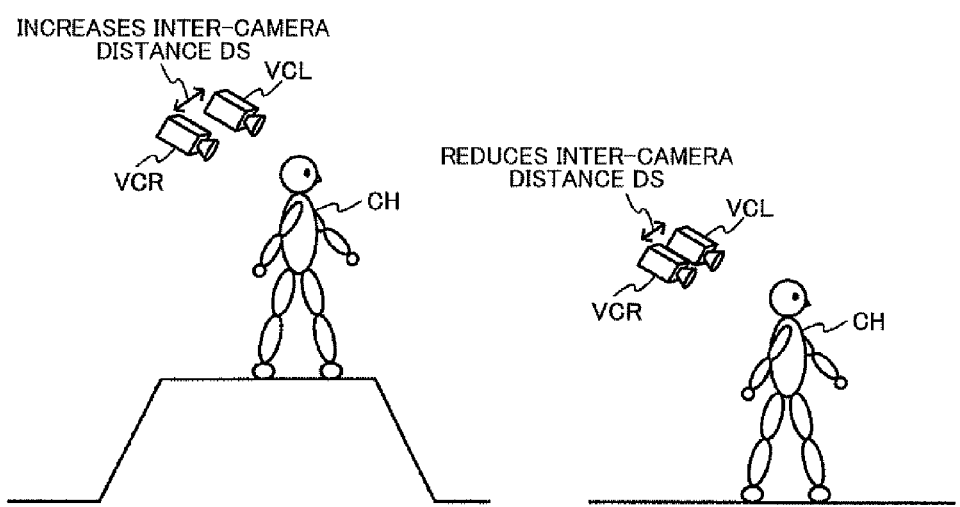

FIG. 9A
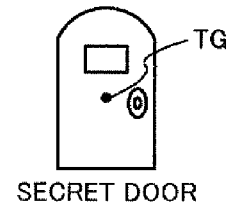
SECRET DOOR
FIG. 9B
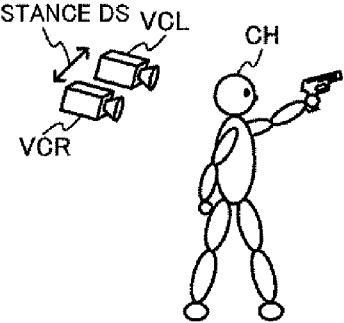
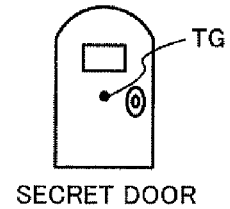
SECRET DOOR
FIG. 9C
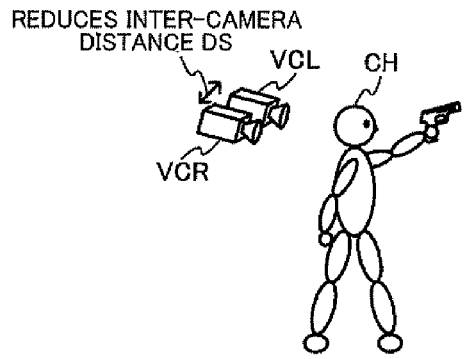
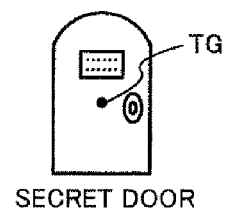
SECRET DOOR

PRESENCE HISTORICAL INFORMATION

| MAP BLOCK | PRESENCE FREQUENCY |
|---|---|
| MB1 | 0 |
| MB2 | 4 |
| MB3 | 6 |
| ⋮ | ⋮ |

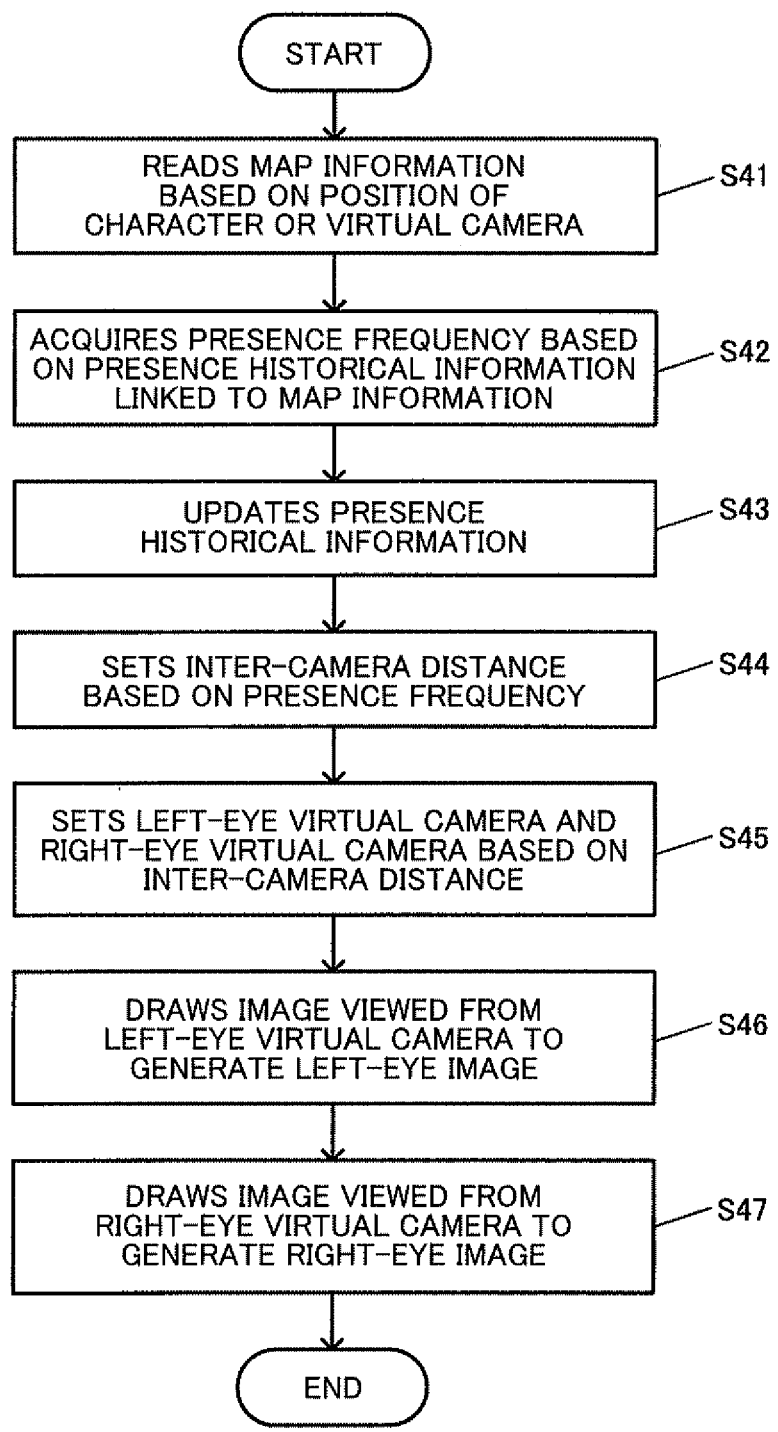

FIG. 14A
| ACCESSORY OBJECT | INTER-CAMERA DISTANCE |
|---|---|
| EOB1 | DS1 |
| EOB2 | DS2 |
| EOB3 | DS3 |
| ⋮ | ⋮ |
FIG. 14B
FIG. 14C
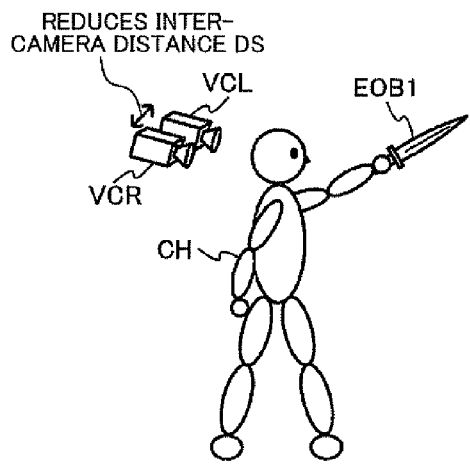
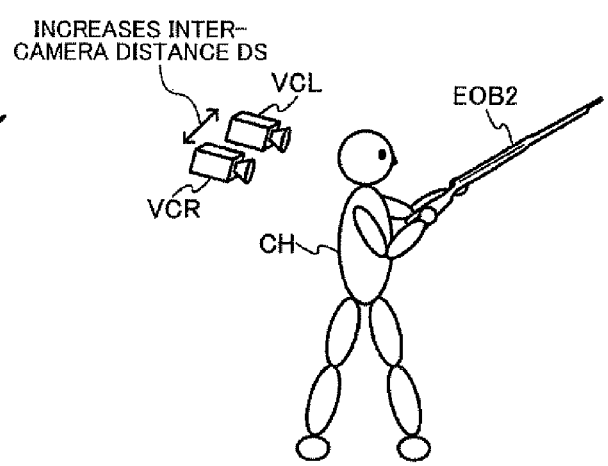
FIG. 14D
| MOTION NUMBER | INTER-CAMERA DISTANCE |
|---|---|
| NMS1 | DS1 |
| NMS2 | DS2 |
| NMS3 | DS3 |
| ⋮ | ⋮ |

FIG. 19A

GAME ENVIRONMENT SETTING
· STEREOSCOPIC OPTION
STEREOSCOPIC METHOD  POLARIZED
STEREOSCOPIC LEVEL (DS)

LOW                              HIGH

TELEVISION SIZE (INCHES)  46
DISTANCE TO TELEVISION (METERS)  4

FIG. 19B

GAME ENVIRONMENT SETTING
· STEREOSCOPIC OPTION
STEREOSCOPIC METHOD  SHUTTER
STEREOSCOPIC LEVEL

UPPER LIMIT (DSH)
REFERENCE (DSR)
LOWER LIMIT (DSL)
LOW                              HIGH

TELEVISION SIZE (INCHES)  46
DISTANCE TO TELEVISION (METERS)  4

IMAGE GENERATION SYSTEM, IMAGE GENERATION METHOD, AND INFORMATION STORAGE MEDIUM

Japanese Patent Application No. 2010-83889 filed on Mar. 31, 2010, is hereby incorporated by reference in its entirety.

BACKGROUND

The present invention relates to an image generation system, an image generation method, an information storage medium, and the like.

In recent years, a stereoscopic image generation system has attracted attention in the fields of movies, games, and the like as a system that generates an image having improved presence. The stereoscopic image generation system generates a left-eye image viewed from a left-eye camera, and a right-eye image viewed from a right-eye camera. The player wears stereoscopic glasses so that the player sees the left-eye image with the left eye and sees the right-eye image with the right eye to obtain stereoscopic vision. JP-A-2004-126902 discloses an image generation system that implements such stereoscopic vision, for example.

The stereoscopic effect observed by the player increases as the inter-camera distance between the left-eye camera and the right-eye camera increases. The stereoscopic effect decreases as the inter-camera distance decreases.

However, an image generation system (e.g., game device) has been configured so that the inter-camera distance is fixed. This makes it impossible to implement effective stereoscopic representation (3D representation) depending on the situation.

For example, the inter-camera distance may be changed depending on the scene. For example, the inter-camera distance may be increased in a long-distance scene so that the stereoscopic effect increases, and may be reduced in a short-distance scene so that a short-range object is easily observed.

However, it is difficult for a game device or the like to implement appropriate stereoscopic representation depending on the game situation when merely changing the inter-camera distance depending on the scene. Specifically, the game situation changes in various ways based on operation information input by the player using an operation section, and it is difficult to expect a change in game situation. Therefore, it is difficult to set the inter-camera distance to an appropriate distance depending on the game situation when merely changing the inter-camera distance depending on the scene. For example, even if the character stands in a place where a distant view is obtained, an object may be present in front of the character when the character has turned around based on an operation performed by the player. Therefore, if the inter-camera distance is increased for only the reason that a distant view is obtained, the player may be given a wrong impression when observing the object present in front of the character due to too high a stereoscopic effect.

When the character moves on a map based on an operation performed by the player, the field-of-view state from the character changes in various ways depending on the place on the map. It is difficult to deal with such a change in field-of-view state by merely changing the inter-camera distance depending on the scene. Moreover, an obstacle object may be positioned between the virtual camera (viewpoint) and the character depending on an operation performed by the player. Such a situation cannot be anticipated by merely determining the game scene.

SUMMARY

According to one aspect of the invention, there is provided an image generation system comprising:

an object space setting section that sets an object space where a plurality of objects are disposed;

a character control section that controls a character that moves in the object space;

a virtual camera control section that controls a virtual camera;

an inter-camera distance setting section that sets an inter-camera distance based on at least one of position information, direction information, and moving state information about the character or the virtual camera, the inter-camera distance being a distance between a left-eye virtual camera and a right-eye virtual camera for generating a stereoscopic image; and an image generation section that generates a left-eye image and a right-eye image, the left-eye image being an image viewed from the left-eye virtual camera in the object space, and the right-eye image being an image viewed from the right-eye virtual camera in the object space.

According to another aspect of the invention, there is provided an image generation system comprising:

an object space setting section that sets an object space where a plurality of objects are disposed;

a time parameter calculation section that calculates a time parameter that is a game-related parameter;

an inter-camera distance setting section that sets an inter-camera distance based on the time parameter, the inter-camera distance being a distance between a left-eye virtual camera and a right-eye virtual camera for generating a stereoscopic image; and an image generation section that generates a left-eye image and a right-eye image, the left-eye image being an image viewed from the left-eye virtual camera in the object space, and the right-eye image being an image viewed from the right-eye virtual camera in the object space.

According to another aspect of the invention, there is provided an image generation method comprising:

setting an object space where a plurality of objects are disposed;

controlling a character that moves in the object space;

controlling a virtual camera;

setting an inter-camera distance based on at least one of position information, direction information, and moving state information about the character or the virtual camera, the inter-camera distance being a distance between a left-eye virtual camera and a right-eye virtual camera for generating a stereoscopic image; and generating a left-eye image and a right-eye image, the left-eye image being an image viewed from the left-eye virtual camera in the object space, and the right-eye image being an image viewed from the right-eye virtual camera in the object space.

According to another aspect of the invention, there is provided an image generation method comprising:

setting an object space where a plurality of objects are disposed;

calculating a time parameter that is a game-related parameter;

setting an inter-camera distance based on the time parameter, the inter-camera distance being a distance between a left-eye virtual camera and a right-eye virtual camera for generating a stereoscopic image; and generating a left-eye image and a right-eye image, the left-eye image being an image viewed from the left-eye virtual camera in the object space, and the right-eye image being an image viewed from the right-eye virtual camera in the object space.

According to another aspect of the invention, there is provided a computer-readable information storage medium storing a program that causes a computer to execute one of the above image generation methods.

BRIEF DESCRIPTION OF THE DRAWINGS

FIGS. 3A to 3D are views illustrative of a method of setting an inter-camera distance based on map information.

FIGS. 9A to 9C are views illustrative of a method of setting an inter-camera distance based on a target point.

FIG. 13 is a flowchart showing a process that sets an inter-camera distance based on presence historical information.

FIGS. 14A to 14D are views illustrative of a method of setting an inter-camera distance based on an accessory object or a motion.

FIGS. 19A and 19B show examples of a game environment setting screen.

DESCRIPTION OF EXEMPLARY EMBODIMENTS

Figure 1:
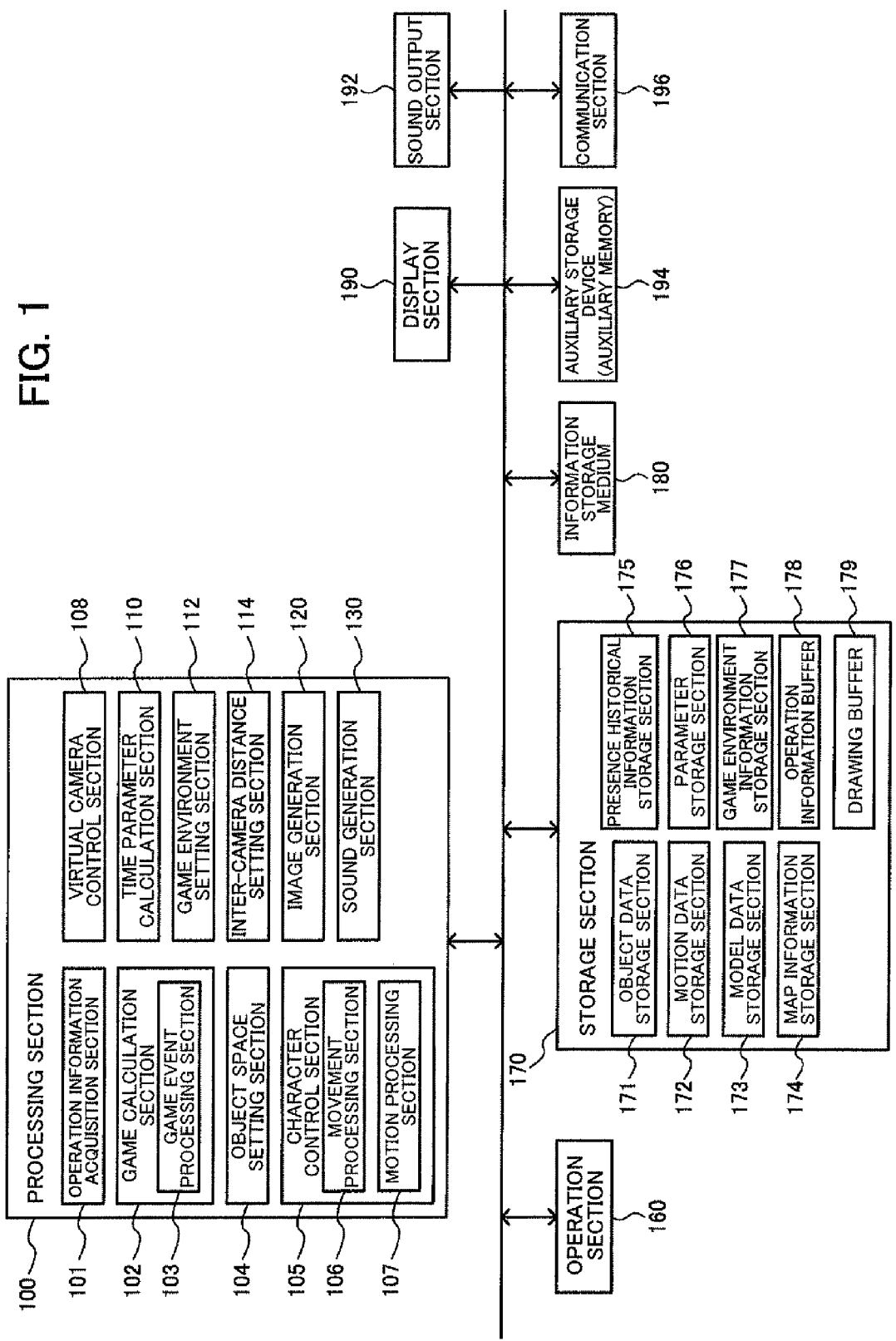
FIG. 1 shows a configuration example of an image generation system according to one embodiment of the invention.

Several aspects of the invention may provide an image generation system, an image generation method, an information storage medium, and the like that can implement appropriate stereoscopic representation depending on the situation.

According to one embodiment of the invention, there is provided an image generation system comprising:

an object space setting section that sets an object space where a plurality of objects are disposed;

a character control section that controls a character that moves in the object space;

a virtual camera control section that controls a virtual camera;

an inter-camera distance setting section that sets an inter-camera distance based on at least one of position information, direction information, and moving state information about the character or the virtual camera, the inter-camera distance being a distance between a left-eye virtual camera and a right-eye virtual camera for generating a stereoscopic image; and an image generation section that generates a left-eye image and a right-eye image, the left-eye image being an image viewed from the left-eye virtual camera in the object space, and the right-eye image being an image viewed from the right-eye virtual camera in the object space.

Specifically, the inter-camera distance that indicates the distance between the left-eye virtual camera and the right-eye virtual camera is set based on at least one of the position information, the direction information, and the moving state information about the character or the virtual camera. An image viewed from the left-eye virtual camera and an image viewed from the right-eye virtual camera are generated as the left-eye image and the right-eye image. This makes it possible to control the inter-camera distance while reflecting the position, the direction, or the moving state of the character or the virtual camera. Therefore, appropriate stereoscopic representation depending on the situation can be implemented as compared with the case of controlling the inter-camera distance depending on the game scene.

In the image generation system, the inter-camera distance setting section may acquire map information about a place where the character or the virtual camera is positioned based on the position information about the character or the virtual camera, and may set the inter-camera distance based on the acquired map information.

According to the above configuration, since the inter-camera distance can be set using various types of information linked to the map information, more intelligent inter-camera distance control can be implemented.

In the image generation system, the inter-camera distance setting section may increase the inter-camera distance when it has been determined that the character or the virtual camera is positioned at a high place based on the map information, and may reduce the inter-camera distance when it has been determined that the character or the virtual camera is positioned at a low place based on the map information.

According to the above configuration, since the inter-camera distance between the left-eye virtual camera and the right-eye virtual camera increases when the character or the virtual camera is positioned at a high place, a distant view can be suitably observed stereoscopically. On the other hand, since the inter-camera distance decreases when the character or the virtual camera is positioned at a low place, a near view around the character or the virtual camera can be suitably observed stereoscopically.

In the image generation system, the inter-camera distance setting section may set the inter-camera distance based on at least one of position information, direction information, and moving state information about a target object that is targeted by the character during a game.

This makes it possible to control the inter-camera distance while reflecting the position, the direction, or the moving state of the target object that is targeted by the character during the game.

In the image generation system, the inter-camera distance setting section may change the inter-camera distance when it has been determined that a direction of the character or the virtual camera has approximately coincided with a direction where the target object is positioned.

According to the above configuration, the inter-camera distance can be controlled based on the positional relationship or the like between the character or the virtual camera and the target object when the direction of the character or the virtual camera has approximately coincided with the direction of the target object.

In the image generation system, the inter-camera distance setting section may increase the inter-camera distance when it has been determined that the target object is positioned at a long distance away from the character or the virtual camera, and may reduce the inter-camera distance when it has been determined that the target object is positioned at a short distance away from the character or the virtual camera.

According to the above configuration, the inter-camera distance is controlled based on the distance between the character or the virtual camera and the target object after it has been determined that the direction of the character or the virtual camera has approximately coincided with the direction of the target object. This improves the stereoscopic visibility of the target object.

In the image generation system, the inter-camera distance setting section may reduce the inter-camera distance when it has been determined that an obstacle object has been positioned between the virtual camera and the character.

According to the above configuration, since the inter-camera distance is reduced when an obstacle object has been positioned between the virtual camera and the character, a situation in which an unnatural image is displayed can be prevented.

In the image generation system, the inter-camera distance setting section may set the inter-camera distance when a target point has been set in the object space so that the character or the virtual camera is guided to the target point.

According to the above configuration, the character or the virtual camera can be guided to the target point by effectively controlling the stereoscopic effect based on the inter-camera distance.

In the image generation system, the inter-camera distance setting section may increase the inter-camera distance when the target point has been set in the object space, and may reduce the inter-camera distance as the character or the virtual camera approaches the target point.

According to the above configuration, since the inter-camera distance increases when the target point has been set, the target point can be easily and stereoscopically observed even if the target point is positioned away from the character. Since the inter-camera distance decreases as the character or the virtual camera approaches the target point, the visibility such of an object or the like around the target point can be improved.

In the image generation system, the inter-camera distance setting section may set the inter-camera distance based on a moving speed of the character or the virtual camera.

This makes it possible to control the inter-camera distance while reflecting the moving speed of the character or the virtual camera.

In the image generation system, the inter-camera distance setting section may increase the inter-camera distance as the moving speed of the character or the virtual camera increases.

Specifically, the inter-camera distance increases as the moving speed of the character or the virtual camera increases, so that a distant view is appropriately stereoscopically represented. Therefore, the character or the virtual camera can be guided to the target point positioned away from the character.

In the image generation system, the inter-camera distance setting section may set the inter-camera distance based on presence historical information about the character or the virtual camera in each place in the object space.

This makes it possible to control the inter-camera distance while reflecting the presence historical information about the character or the virtual camera in each place in the object space.

In this case, the inter-camera distance setting section may reduces the inter-camera distance in a place where it has been determined that the presence frequency of the character or the virtual camera is low based on the presence historical information, and may increase the inter-camera distance in a place where it has been determined that the presence frequency of the character or the virtual camera is high based on the presence historical information.

Specifically, the inter-camera distance decreases when the character or the virtual camera is positioned in a place where the presence frequency is low, and increases when the character or the virtual camera is positioned in a place where the presence frequency is high. Therefore, the stereoscopic visibility of a near view is improved when the character is positioned in a place where the character has visited for the first time, and the stereoscopic visibility of a distant view is improved when the character is positioned in a place where the character has visited many times.

In the image generation system, the inter-camera distance setting section may set the inter-camera distance based on the type of accessory object attached to the character.

This makes it possible to control the inter-camera distance while reflecting the type of accessory object attached to the character.

The accessory object may be a weapon object. The inter-camera distance setting section may reduce the inter-camera distance when the weapon object is a short-range attack object, and may increase the inter-camera distance when the weapon object is a long-range attack object.

Specifically, since the inter-camera distance decreases when the character is equipped with the short-range attack object, the player can easily attack an enemy or the like that is positioned near the character. On the other hand, since the inter-camera distance increases when the character is equipped with the long-range attack object, the player can easily attack an enemy or the like that is positioned away from the character.

In the image generation system, the inter-camera distance setting section may set the inter-camera distance based on a motion of the character.

This makes it possible to implement intelligent inter-camera distance control that reflects the motion of the character.

In the image generation system, the inter-camera distance setting section may change the inter-camera distance by repeatedly increasing and reducing the inter-camera distance when a given event has been generated in connection with the character.

This makes it achieve an effect that utilizes a change in stereoscopic level as a result of changing the inter-camera distance.

According to another embodiment of the invention, there is provided an image generation system comprising:

an object space setting section that sets an object space where a plurality of objects are disposed;

a time parameter calculation section that calculates a time parameter that is a game-related parameter;

an inter-camera distance setting section that sets an inter-camera distance based on the time parameter, the inter-camera distance being a distance between a left-eye virtual camera and a right-eye virtual camera for generating a stereoscopic image; and an image generation section that generates a left-eye image and a right-eye image, the left-eye image being an image viewed from the left-eye virtual camera in the object space, and the right-eye image being an image viewed from the right-eye virtual camera in the object space.

Specifically, the game-related time parameter is calculated, and the inter-camera distance that indicates the distance between the left-eye virtual camera and the right-eye virtual camera is set based on the time parameter. An image viewed from the left-eye virtual camera and an image viewed from the right-eye virtual camera are generated as the left-eye image and the right-eye image. This makes it possible to implement inter-camera distance control that reflects a change in time parameter, for example. Therefore, appropriate stereoscopic representation depending on the situation can be implemented as compared with the case of controlling the inter-camera distance depending on the game scene.

In the image generation system, the time parameter calculation section may calculate an elapsed time parameter as the time parameter, the elapsed time parameter indicating a time elapsed after a game has started; and the inter-camera distance setting section may increase the inter-camera distance as the time indicated by the elapsed time parameter increases.

Specifically, the inter-camera distance increases as the elapsed time increases. Therefore, the inter-camera distance can be increased after the player has become accustomed to the stereoscopic field-of-view environment, so that a situation in which the player is given a wrong impression due to a high stereoscopic level can be suppressed.

The elapsed time parameter time parameter may be a cumulative play time parameter that indicates the cumulative play time of the player. The inter-camera distance setting section may increase the inter-camera distance as the cumulative play time indicated by the cumulative play time parameter increases.

Specifically, the inter-camera distance increases as the cumulative play time increases. Therefore, the inter-camera distance can be increased after the player has become accustomed to the stereoscopic field-of-view environment, so that a situation in which the player is given a wrong impression due to a high stereoscopic level can be suppressed.

The image generation system may further comprise:

a game environment setting section that performs a game environment setting process based on information input by a player, the inter-camera distance setting section may bring the inter-camera distance closer to a reference distance as the time indicated by the time parameter increases when the reference distance has been set by the game environment setting process.

This makes it possible for the player to set the reference distance of the inter-camera distance during the game environment setting process. The inter-camera distance approaches the reference distance as the time indicated by the time parameter increases. This makes it possible to implement inter-camera distance control that reflects the player's will.

The image generation system may further comprise:

an operation information acquisition section that acquires operation information input from an operation section operated by a player, the inter-camera distance setting section may monitor the operation information acquired by the operation information acquisition section, and may control the inter-camera distance based on a monitoring result of the operation information.

This makes it possible to implement inter-camera distance control that reflects the operation information input from the operation section.

In this case, the inter-camera distance setting section may increase the inter-camera distance as the time indicated by the time parameter increases, and may reduce the inter-camera distance when it has been determined that the operation information has not been input for a given period.

Specifically, the inter-camera distance is reduced when it has been determined that the operation information has not been input for a given period (i.e., the player has suspended the game). When the player has started the game again, the game is executed in a state in which the inter-camera distance is reduced. This suppresses a situation in which the player is given a wrong impression.

The inter-camera distance setting section may reduce the inter-camera distance when it has been determined that the input frequency of the operation information is higher than a reference frequency.

Specifically, the inter-camera distance decreases when the input frequency of the operation information is high, so that the stereoscopic visibility of a near view is improved.

The image generation system may include a game environment setting section that performs a game environment setting process based on information input by a player, and the inter-camera distance setting section may set the inter-camera distance based on at least one of an allowable change range and the reference distance of the inter-camera distance set by the game environment setting process.

This makes it possible for the player to set the allowable change range and the reference distance of the inter-camera distance during the game environment setting process. It is also possible to implement inter-camera distance control that reflects the allowable change range or the reference distance set by the player.

The inter-camera distance setting section may change the inter-camera distance within the allowable change range set during the game environment setting process.

This makes it possible to change the inter-camera distance within the allowable change range while reflecting the player's will to a certain extent. Therefore, the inter-camera distance can be set while absorbing a difference between players, so that a novel stereoscopic interface environment can be provided.

According to another embodiment of the invention, there is provided an image generation method comprising:

setting an object space where a plurality of objects are disposed;

controlling a character that moves in the object space;

controlling a virtual camera;

setting an inter-camera distance based on at least one of position information, direction information, and moving state information about the character or the virtual camera, the inter-camera distance being a distance between a left-eye virtual camera and a right-eye virtual camera for generating a stereoscopic image; and generating a left-eye image and a right-eye image, the left-eye image being an image viewed from the left-eye virtual camera in the object space, and the right-eye image being an image viewed from the right-eye virtual camera in the object space.

According to another embodiment of the invention, there is provided an image generation method comprising:

setting an object space where a plurality of objects are disposed;

calculating a time parameter that is a game-related parameter;

setting an inter-camera distance based on the time parameter, the inter-camera distance being a distance between a left-eye virtual camera and a right-eye virtual camera for generating a stereoscopic image; and generating a left-eye image and a right-eye image, the left-eye image being an image viewed from the left-eye virtual camera in the object space, and the right-eye image being an image viewed from the right-eye virtual camera in the object space.

According to another embodiment of the invention, there is provided a computer-readable information storage medium storing a program that causes a computer to execute one of the above image generation methods.

Exemplary embodiments of the invention are described below. Note that the following exemplary embodiments do not in any way limit the scope of the invention laid out in the claims. Note also that all of the elements of the following exemplary embodiments should not necessarily be taken as essential elements of the invention.

1. Configuration

FIG. 1 shows an example of a block diagram of an image generation system (game system) according to one embodiment of the invention. Note that the image generation system according to this embodiment is not limited to the configuration shown in FIG. 1. Various modifications may be made, such as omitting some of the elements (sections) or adding other elements (sections).

An operation section 160 allows the player to input operation data. The function of the operation section 160 may be implemented by a direction key, an operation button, an analog stick, a lever, a sensor (e.g., angular velocity sensor or acceleration sensor), a microphone, a touch panel display, or the like.

A storage section 170 serves as a work area for a processing section 100, a communication section 196, and the like. The function of the storage section 170 may be implemented by a RAM (DRAM or VRAM) or the like. A game program and game data that is necessary when executing the game program are stored in the storage section 170.

An information storage medium 180 (computer-readable medium) stores a program, data, and the like. The function of the information storage medium 180 may be implemented by an optical disk (CD or DVD), a hard disk drive (HDD), a memory (e.g., ROM), or the like. The processing section 100 performs various processes according to this embodiment based on a program (data) stored in the information storage medium 180. Specifically, a program that causes a computer (i.e., a device including an operation section, a processing section, a storage section, and an output section) to function as each section according to this embodiment (i.e., a program that causes a computer to execute the process of each section) is stored in the information storage medium 180.

A display section 190 outputs an image generated according to this embodiment. The function of the display section 190 may be implemented by an LCD, an organic EL display, a CRT, a touch panel display, a head mount display (HMD), or the like. A sound output section 192 outputs sound generated according to this embodiment. The function of the sound output section 192 may be implemented by a speaker, a headphone, or the like.

An auxiliary storage device 194 (auxiliary memory or secondary memory) is a storage device used to supplement the capacity of the storage section 170. The auxiliary storage device 194 may be implemented by a memory card such as an SD memory card or a multimedia card, or the like.

The communication section 196 communicates with the outside (e.g., another image generation system, a server, or a host device) via a cable or wireless network. The function of the communication section 196 may be implemented by hardware such as a communication ASIC or a communication processor or communication firmware.

A program (data) that causes a computer to function as each section according to this embodiment may be distributed to the information storage medium 180 (or the storage section 170 or the auxiliary storage device 194) from an information storage medium included in a server (host device) via a network and the communication section 196. Use of the information storage medium included in the server (host device) is also included within the scope of the invention.

The processing section 100 (processor) performs a game process, an image generation process, a sound generation process, and the like based on operation data from the operation section 160, a program, and the like. The processing section 100 performs various processes using the storage section 170 as a work area. The function of the processing section 100 may be implemented by hardware such as a processor (e.g., CPU or GPU) or an ASIC (e.g., gate array), or by a program.

The processing section 100 includes an operation information acquisition section 101, a game calculation section 102, an object space setting section 104, a character control section 105, a virtual camera control section 108, a time parameter calculation section 110, a game environment setting section 112, an inter-camera distance setting section 114, an image generation section 120, and a sound generation section 130. The game calculation section 102 includes a game event processing section 103, and the character control section 105 includes a movement processing section 106 and a motion processing section 107. Note that various modifications may be made, such as omitting some of these elements or adding other elements.

The operation information acquisition section 101 acquires operation information. For example, the operation information acquisition section 101 acquires operation information input from the operation section 160 operated by the player. Specifically, the operation information input by the player by operating the operation button, the operation lever, or the like of the operation section 160 is output from the operation section 160 every frame, and stored in an operation information buffer 178. The operation information acquisition section 101 acquires the operation information that is thus input every frame. The operation information may be information that indicates whether or not the operation button has been pressed, information about the angle by which the operation lever has been tilted, or the like. When the operation section 160 includes a motion sensor (e.g., angular velocity sensor), sensor information from the motion sensor is also used as the operation information.

The game calculation section 102 performs a game calculation process. The game calculation process includes starting the game when game start conditions have been satisfied, proceeding with the game, calculating the game results, and finishing the game when game finish conditions have been satisfied, for example.

The game event processing section 103 included in the game calculation section 102 performs a game event management process. For example, the game event processing section 103 determines whether or not a generation condition for a game event (e.g., enemy appearance event, attack event, game story development switch event, or map switch event) has been satisfied. The game event processing section 103 generates the game event (sets a game event flag) that corresponds to the generation condition that has been satisfied.

The object space setting section 104 sets an object space where a plurality of objects are disposed. For example, the object space setting section 104 disposes an object (i.e., an object formed by a primitive surface such as a polygon, a free-form surface, or a subdivision surface) that represents a display object such as a character (e.g., human, animal, robot, car, ship, or airplane), a map (topography), a building, a course (road), a tree, or a wall in the object space. Specifically, the object space setting section 104 determines the position and the rotational angle (synonymous with orientation or direction) of the object in a world coordinate system, and disposes the object at the determined position (X, Y, Z) and the determined rotational angle (rotational angles around X, Y, and Z axes). More specifically, an object data storage section 171 included in the storage section 170 stores object data that is linked to an object number and indicates the position, the rotation angle, the moving speed, the moving direction, and the like of the object (part object). The object space setting section 104 updates the object data every frame, for example.

The character control section 105 controls the character that moves (makes a motion) in the object space. For example, the movement processing section 106 included in the character control section 105 moves the character (model object or moving object). For example, the character control section 106 moves the character in the object space based on the operation information input by the player using the operation section 160, a program (movement algorithm), various types of data (motion data), and the like. More specifically, the character control section 106 performs a simulation process that sequentially calculates movement information (position, rotation angle, speed, or acceleration) about the character every frame (e.g., 1/60th of a second). The term "frame" refers to a time unit used when performing a movement process, a motion process, and an image generation process.

The motion processing section 107 included in the character control section 105 performs a motion process (motion reproduction or motion generation) that causes the character to make a motion (animation). The motion process may be implemented by reproducing the motion of the character based on motion data stored in a motion data storage section 172, for example.

Specifically, the motion data storage section 172 stores motion data including the position or the rotational angle (three-axis rotation angles of a child bone with respect to a parent bone) of each bone (i.e., each part object that forms the character) that forms the skeleton of the character (model object). The motion processing section 107 reproduces the motion of the character by reading the motion data from the motion data storage section 172, and moving each bone (part object) of the skeleton (i.e., changing the shape of the skeleton) based on the motion data.

The motion data stored in the motion data storage section 172 may be generated by capturing the motion of a human provided with a sensor. Note that the motion data may be generated in real time by a physical simulation (simulation utilizing physical calculations (or pseudo-physical calculations)), motion blending, or the like. The motion may be reproduced using inverse kinematics or the like in order to reproduce a realistic motion with a small amount of motion data.

The model data storage section 173 stores model data about a model object that indicates the character. The model data specifies the shape of the model object that indicates the character, for example. The model data determines the basic posture, the basic shape, and the like of the model object. Specifically, the model data storage section 173 stores initial state information such as the position (position relative to a parent bone) and the initial rotation angle (rotation angle of each bone in the basic posture) of each bone that forms the skeleton of the model object. The model data storage section 173 also stores vertex data (e.g., vertex position) about the model object. The motion process is implemented by updating the initial state information (e.g., initial rotation angle) included in the model data based on the motion data.

The virtual camera control section 108 controls a virtual camera (viewpoint or reference virtual camera) for generating an image viewed from a given (arbitrary) viewpoint in the object space. Specifically, the virtual camera control section 108 controls the position (X, Y, Z) or the rotational angle (rotational angles around X, Y, and Z axes) of the virtual camera (i.e., controls the viewpoint position, the line-of-sight direction, or the angle of view).

For example, when photographing the character from behind using the virtual camera, the virtual camera control section 108 controls the position or the rotational angle (direction) of the virtual camera so that the virtual camera follows a change in the position or the rotation of the character. In this case, the virtual camera control section 108 may control the virtual camera based on information (e.g., position, rotation angle, or speed) about the character obtained by the movement processing section 106. Alternatively, the virtual camera control section 108 may rotate the virtual camera by a predetermined rotational angle, or may move the virtual camera along a predetermined path. In this case, the virtual camera control section 108 controls the virtual camera based on virtual camera data that specifies the position (moving path) or the rotational angle of the virtual camera.

The time parameter calculation section 110 calculates (sets) a time parameter. For example, the time parameter calculation section 110 measures the passage of time indicated by the time parameter. The time parameter indicates a game-related time parameter (e.g., elapsed time parameter). The elapsed time parameter indicates the elapsed time during the game. For example, the elapsed time parameter indicates the elapsed time after the game has started. The elapsed time parameter may be a cumulative play time parameter. The cumulative play time parameter indicates the cumulative play time of the player. For example, the cumulative play time parameter is obtained by summing up the game play times of the player. The value of the parameter (e.g., time parameter) is stored in a parameter storage section 176.

The game environment setting section 112 sets a game environment. For example, the game environment setting section 112 sets the game environment based on information input by the player. Specifically, the game environment setting section 112 displays a game environment setting screen (option setting screen) on the display section 190. The game environment setting section 112 sets game environment information necessary for the player to play the game based on information input by the player to the game environment setting screen using the operation section 160. The game environment information set by the game environment setting section 112 is stored in the game environment information storage section 177.

The inter-camera distance setting section 114 sets an inter-camera distance. For example, the inter-camera distance setting section 114 sets the inter-camera distance based on various game parameters (e.g., parameters of position information, direction information, and moving state information about the character or the virtual camera, time parameter, and game event parameter).

The image generation section 120 performs a drawing process based on the results of various processes (game process and simulation process) performed by the processing section 100 to generate an image, and outputs the generated image to the display section 190. Specifically, the image generation section 120 performs a geometric process (e.g., coordinate transformation (world coordinate transformation and camera coordinate transformation), clipping, perspective transformation, or light source process), and generates drawing data (e.g., primitive surface vertex position coordinates, texture coordinates, color data, normal vector, or α-value) based on the results of the geometric process. The image generation section 120 draws the object (one or more primitive surfaces) subjected to perspective transformation in a drawing buffer 179 (i.e., a buffer (e.g., frame buffer or work buffer) that can store image information in pixel units) based on the drawing data (primitive surface data). The image generation section 120 thus generates an image viewed from the virtual camera (given viewpoint) in the object space. The drawing process may be implemented by a vertex shader process or a pixel shader process.

The sound generation section 130 performs a sound process based on the results of various processes performed by the processing section 100 to generate game sound (e.g., background music (BGM), effect sound, or voice), and outputs the generated game sound to the sound output section 192.

The inter-camera distance setting section 114 sets an inter-camera distance based on at least one of position information, direction information, and moving state information about the character or the virtual camera, the inter-camera distance being the distance between a left-eye virtual camera and a right-eye virtual camera for generating a stereoscopic image.

The position information refers to information (coordinates) about a representative position of the character or the virtual camera, for example. The direction information refers to information about the direction (facing direction, line-of-sight direction, or moving direction) of the character or the direction (line-of-sight direction or moving direction) of the virtual camera, for example. The moving state information refers to speed information, acceleration information, or moving path information about the character or the virtual camera, for example. The inter-camera distance refers to information (parameter) that indicates the distance between a left-eye virtual camera and a right-eye virtual camera for generating a stereoscopic image. The inter-camera distance may be the distance between the left-eye virtual camera and the right-eye virtual camera, or may be information (e.g., stereoscopic level) equal to the distance between the left-eye virtual camera and the right-eye virtual camera.

The image generation section 120 generates a left-eye image that is an image viewed from the left-eye virtual camera in the object space. The image generation section 120 also generates a right-eye image that is an image viewed from the right-eye virtual camera in the object space. Specifically, the image generation section 120 renders the object in the object space from the viewpoint of the left-eye virtual camera to generate a left-eye image, and renders the object in the object space from the viewpoint of the right-eye virtual camera to generate a right-eye image.

The virtual camera control section 108 controls a reference virtual camera for setting the left-eye virtual camera and the right-eye virtual camera, for example. The virtual camera control section 108 calculates position information (viewpoint position) and direction information (line-of-sight direction) about the left-eye virtual camera and the right-eye virtual camera based on position information and direction information about the reference virtual camera and the inter-camera distance. Note that the virtual camera control section 108 may directly control the left-eye virtual camera and the right-eye virtual camera. The image generation section 120 generates a left-eye image using the left-eye virtual camera and a right-eye image using the right-eye virtual camera in a stereoscopic mode. The image generation section 120 generates an image viewed from the reference virtual camera as a pseudo-three-dimensional image in a pseudo-three-dimensional image display mode, for example.

A stereoscopic glass method, a naked-eye method using a lenticular lens, or the like may be used as the stereoscopic method. Examples of the stereoscopic glass method include a polarized glass method, a page-flip method, a two-color separation method, and the like. When using the polarized glass method, a left-eye image and a right-eye image are alternately displayed in an odd-numbered line and an even-numbered line of the display section 190, and are observed through polarized glasses (e.g., glasses provided with a horizontal polarizing filter (left) and a vertical polarizing filter (right)) to implement a stereoscopic view. Alternatively, a left-eye image and a right-eye image are projected using a projector provided with a special polarizing filter, and observed through polarized glasses to implement a stereoscopic view. When using the page-flip method, a left-eye image and a right-eye image are alternately displayed on the display section 190 in a given cycle (e.g., every 1/120th of a second or 1/60th of a second). A left-eye liquid crystal shutter and a right-eye liquid crystal shutter of glasses are alternately opened and closed in the above cycle to implement a stereoscopic view. When using the two-color separation method, an anaglyph image is generated, and observed through red-cyan glasses or the like to implement a stereoscopic view.

The image generation section 120 or the display section 190 may be provided with the function of generating a stereoscopic image from the left-eye image and the right-eye image. For example, the image generation section 120 outputs side-by-side image signals. The display section 190 then displays a field-sequential image in which the left-eye image and the right-eye image are alternately assigned to an odd-numbered line and an even-numbered line based on the side-by-side image signals. The display section 190 may display a frame-sequential image in which the left-eye image and the right-eye image are alternately switched in a given cycle. Alternatively, the image generation section 120 may generate a field-sequential image or a frame-sequential image, and output the generated image to the display section 190.

The inter-camera distance setting section 114 acquires map information about a place where the character or the virtual camera is positioned based on the position information (representative position information) about the character or the virtual camera. Specifically, the inter-camera distance setting section 114 reads the map information corresponding to the place where the character or the virtual camera is positioned from a map information storage section 174. The inter-camera distance setting section 114 sets the inter-camera distance based on the acquired map information. Specifically, the inter-camera distance setting section 114 increases the inter-camera distance when it has been determined that the character or the virtual camera is positioned at a high place (i.e., a place positioned higher than a reference height) based on the map information. The inter-camera distance setting section 114 reduces the inter-camera distance when it has been determined that the character or the virtual camera is positioned at a low place (i.e., a place positioned lower than a reference height) based on the map information.

The inter-camera distance setting section 114 may set the inter-camera distance based on at least one of position information, direction information, and moving state information (e.g., speed, acceleration, and moving path) about a target object that is targeted by the character during the game. The term "target object" used herein refers to an object that is targeted by the character as to attack, defense, movement, or the like. The inter-camera distance setting section 114 changes the inter-camera distance when it has been determined that the direction of the character or the virtual camera has approximately coincided with the direction where the target object is positioned, for example. Specifically, the inter-camera distance setting section 114 reduces or increases the inter-camera distance when it has been determined that the line-of-sight direction of the virtual camera is within a given direction range including the direction where the target object is positioned. More specifically, the inter-camera distance setting section 114 increases the inter-camera distance when it has been determined that the target object is positioned at a long distance (i.e., a distance longer than a reference distance) away from the character or the virtual camera. The inter-camera distance setting section 114 reduces the inter-camera distance when it has been determined that the target object is positioned at a short distance (i.e., a distance shorter than a reference distance) away from the character or the virtual camera.

The inter-camera distance setting section 114 may reduce the inter-camera distance when it has been determined that an obstacle object has been positioned between the virtual camera and the character. For example, an object that intersects a line segment that connects the virtual camera and the character (i.e., a line segment that connects the position of the virtual camera and the representative position of the character) is determined to be the obstacle object. The inter-camera distance setting section 114 temporarily reduces the inter-camera distance in a period in which the obstacle object is detected.

The inter-camera distance setting section 114 may set the inter-camera distance when a target point has been set in the object space so that the character or the virtual camera is guided (navigated) to the target point. Specifically, the inter-camera distance setting section 114 sets the inter-camera distance to prompt the player to move the character toward the target point. More specifically, the inter-camera distance setting section 114 increases the inter-camera distance when the target point has been set in the object space. The inter-camera distance setting section 114 reduces the inter-camera distance as the character or the virtual camera approaches the target object.

The inter-camera distance setting section 114 may set the inter-camera distance based on the moving speed (moving state information in a broad sense) of the character or the virtual camera. For example, the inter-camera distance setting section 114 increases the inter-camera distance as the moving speed of the character or the virtual camera increases. The moving speed may be information equivalent to the moving speed.

The inter-camera distance setting section 114 may set the inter-camera distance based on presence historical information about the character or the virtual camera in each place in the object space. The term "presence historical information" refers to information that indicates the presence history (presence frequency) of the character or the virtual camera on a game field (map) where the character or the virtual camera moves. The presence historical information is stored in a presence historical information storage section 175. Specifically, the inter-camera distance setting section 114 reduces the inter-camera distance in a place where it has been determined that the presence frequency of the character or the virtual camera is low (i.e., a place where the presence frequency is lower than a reference frequency) based on the presence historical information. The inter-camera distance setting section 114 increases the inter-camera distance in a place where it has been determined that the presence frequency of the character or the virtual camera is high (i.e., a place where the presence frequency is higher than a reference frequency) based on the presence historical information.

The inter-camera distance setting section 114 may set the inter-camera distance based on the type of accessory object attached to the character. The term "accessory object" used herein refers to an object (e.g., weapon, clothes, protector, or item) that is possessed or worn by the character during the game. The inter-camera distance setting section 114 reduces the inter-camera distance when a weapon object is a short-range attack object. The inter-camera distance setting section 114 increases the inter-camera distance when the weapon object is a long-range attack object. The term "short-range attack object" used herein refers to an object (i.e., an object having a short attack range) set as a short-range attack weapon using a table or the like. The term "long-range attack object" used herein refers to an object (i.e., an object having an attack range longer than that of the short-range attack object) set as a long-range attack weapon using a table or the like.

The inter-camera distance setting section 114 may set the inter-camera distance based on the motion of the character. Specifically, the inter-camera distance is linked to each motion, and the left-eye virtual camera and the right-eye virtual camera are set at the inter-camera distance linked to the reproduced motion. For example, the inter-camera distance when the character makes a squat motion differs from the inter-camera distance when the character makes a jump motion.

The inter-camera distance setting section 114 may change the inter-camera distance (repeatedly increase and reduce the inter-camera distance) when a given event has been generated in connection with the character. For example, the inter-camera distance setting section 114 changes (swings) the inter-camera distance using a change function (periodic function) of which the amplitude gradually decreases. The game event processing section 103 included in the game calculation section 102 determines generation of each event during the game.

When the time parameter calculation section 110 has performed a game-related time parameter calculation process (measurement process or setting process), the inter-camera distance setting section 114 sets the inter-camera distance (i.e., the distance between the left-eye virtual camera and the right-eye virtual camera for generating a stereoscopic image) based on the time parameter. For example, the time parameter calculation section 110 calculates an elapsed time parameter (i.e., the time elapsed after the game has started) as the time parameter. In this case, the inter-camera distance setting section 114 increases the inter-camera distance as the time indicated by the elapsed time parameter increases. Alternatively, the time parameter calculation section 110 calculates a cumulative play time parameter (i.e., the cumulative play time of the player) as the time parameter (elapsed time parameter). In this case, the inter-camera distance setting section 114 increases the inter-camera distance as the cumulative play time indicated by the cumulative play time parameter increases.

The game environment setting section 112 performs a game environment setting process based on information input by the player using the game environment setting screen, for example. The game environment information set during the game environment setting process is stored in the game environment information storage section 177. The inter-camera distance setting section 114 brings the inter-camera distance closer to a reference distance as the time indicated by the time parameter increases when the reference distance for the inter-camera distance has been set by the game environment setting process. Specifically, the inter-camera distance setting section 114 gradually brings the inter-camera distance closer to the reference distance set by the player.

The operation information acquisition section 101 acquires the operation information input from the operation section 160 operated by the player. The inter-camera distance setting section 114 monitors the operation information, and controls the inter-camera distance based on the monitoring result. Specifically, the inter-camera distance setting section 114 increases the inter-camera distance as the time (elapsed time or cumulative play time) indicated by the time parameter (elapsed time parameter or cumulative play time parameter) increases. The inter-camera distance setting section 114 reduces the inter-camera distance when it has been determined that the operation information has not been input for a given period. Specifically, the inter-camera distance setting section 114 restores the inter-camera distance. The inter-camera distance setting section 114 may reduce the inter-camera distance when it has been determined that the input frequency of the operation information (e.g., the number of inputs per unit time) is higher than a reference frequency. For example, the inter-camera distance setting section 114 reduces the inter-camera distance when it has been determined that the player quickly and successively operated the operation button or the like of the operation section 160.

The inter-camera distance setting section 114 may set the inter-camera distance based on at least one of an allowable change range of the inter-camera distance and a reference distance for the inter-camera distance set during the game environment setting process (input process) performed by the game environment setting section 112. Specifically, the inter-camera distance setting section 114 sets the inter-camera distance based on the allowable change range or the reference distance when the player has input the allowable change range or the reference distance. More specifically, the inter-camera distance setting section 114 changes the inter-camera distance within the allowable change range set during the game environment setting process.

2. Method

The method according to this embodiment is described in detail below.

2.1 Setting of Inter-Camera Distance Based on Position Information and the Like about Character A stereoscopic level can be controlled by increasing or reducing the inter-camera distance between a left-eye virtual camera and a right-eye virtual camera. For example, the inter-camera distance (stereoscopic level) may be set using an option screen (e.g., game environment setting screen) (first method).

According to the first method, however, when the inter-camera distance has been set using the option screen, a stereoscopic image is always generated during the game using the inter-camera distance that has been set. This makes it impossible to implement appropriate stereoscopic representation depending on the game situation.

The player may be allowed to arbitrarily change the inter-camera distance during the game by operating the operation section 160 (second method). For example, the inter-camera distance is changed when the player has operated the operation lever of the operation section 160 so that the stereoscopic level changes in stages (e.g., in three stages). According to the second method, the player can change the stereoscopic level to the desired level during the game.

However, the second method requires the player to operate the operation lever or the like in order to change the stereoscopic level by changing the inter-camera distance. This makes it difficult to change the stereoscopic level in real time depending on the game situation that changes in various ways.

The inter-camera distance may be changed depending on the scene of the game (third method). For example, the inter-camera distance is increased in a scene that requires a high stereoscopic level, and is reduced in a scene that requires a low stereoscopic level.

According to the third method, however, since the inter-camera distance changes only when the scene of the game changes, the inter-camera distance is controlled monotonously. This makes it impossible to implement intelligent inter-camera distance control based on the current game situation of the player. The player is given a wrong impression when the degree of stereoscopic representation is high, but becomes accustomed to such stereoscopic representation with the passage of time. However, the third method that controls the inter-camera distance depending on the scene does not take the above point into consideration.

In order to deal with the above problems, this embodiment employs a method that controls the inter-camera distance based on the position information, the direction information, or the moving state information about the character or the virtual camera.

Figure 2A:
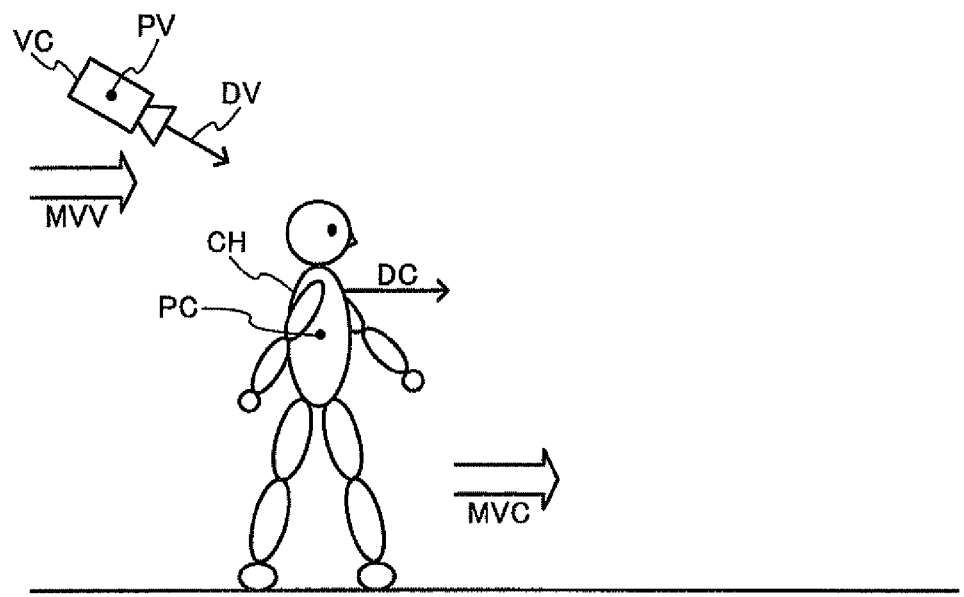
FIGS. 2A to 2C are views illustrative of a method of setting an inter-camera distance according to one embodiment of the invention.
Figure 2B:
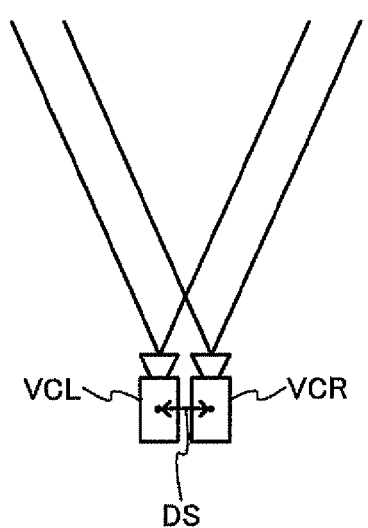
Figure 2C:
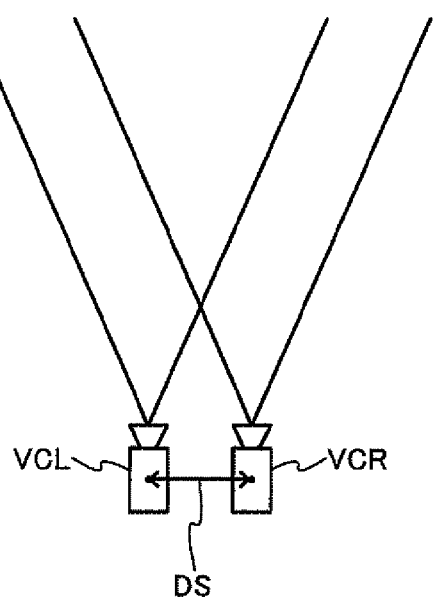

In FIG. 2A, a character CH moves on a game field in the object space, and a virtual camera VC follows the game character CH. In this case, an inter-camera distance DS between a left-eye virtual camera VCL and a right-eye virtual camera VCR shown in FIGS. 2B and 2C is set based on a position PC (representative position), a direction DC (facing direction, line-of-sight direction, or moving direction), or moving state information MVC (speed, acceleration, or moving path) of the character CH. Alternatively, the inter-camera distance DS is set based on a position PV (viewpoint position), a direction DV (line-of-sight direction or moving direction), or moving state information MVV (speed, acceleration, or moving path) of the virtual camera VC (VCL, VCR) that corresponds to the viewpoint of the player. When using a first-person viewpoint, the character CH is a virtual object that is not displayed on the display section 190, and the player moves in the object space using the viewpoint of the virtual camera VC as the viewpoint of the player.

In FIG. 2B, the inter-camera distance DS is reduced based on the information (e.g., position or direction) shown in FIG. 2A. A stereoscopic effect immediately in front of the virtual camera can be enhanced by reducing the inter-camera distance DS. Moreover, an object positioned at a short distance away from the virtual camera is easily observed stereoscopically due to a moderate stereoscopic effect. An object positioned at a long distance away from the virtual camera in the depth direction is observed stereoscopically to only a small extent.

In FIG. 2C, the inter-camera distance DS is increased based on the information (e.g., position or direction) shown in FIG. 2A. A stereoscopic effect in the depth direction can be enhanced by increasing the inter-camera distance DS. The player can stereoscopically observe an object positioned at a long distance away from the virtual camera. It is difficult for the player to observe an object positioned at a short distance away from the virtual camera due to a flicker.

Specifically, when using the third method that changes the inter-camera distance depending on the scene, the inter-camera distance is reduced in a short-distance scene that is considered to mainly include objects positioned at a short distance away from the virtual camera, and is increased in a long-distance scene that is considered to mainly include objects positioned at a long distance away from the virtual camera.

However, it may be necessary to increase the inter-camera distance even in a short-distance scene, or reduce the inter-camera distance even in a long-distance scene depending on the position, the direction, or the moving state of the character or the virtual camera. This applies to a case where a long-distance scene is present in front of the character, and the character has looked back at a short-range object positioned behind the character, a case where an enemy character has appeared in front of the character in a long-distance scene, or a case where an obstacle object has been positioned between the virtual camera and the character, for example. When controlling the inter-camera distance depending on the scene, the inter-camera distance can be changed only at a game stage change timing or the like. This makes it impossible to implement intelligent inter-camera distance control based on the height and the shape of the map where the character moves.

According to this embodiment, the inter-camera distance is changed based on the position, the direction, or the moving state of the character or the virtual camera. Therefore, when the character has looked back at an object that is positioned close to the character in a state in which a long-distance scene is present in front of the character, it is possible to change the inter-camera distance by detecting a change in the direction of the character.

Specifically, when the character faces forward, the inter-camera distance DS is increased (see FIG. 2C) corresponding to the long-distance scene present in front of the character, so that the distant object can be observed stereoscopically. When it has been detected that the character has looked back at an object that is positioned close to the character, the inter-camera distance DS is reduced (see FIG. 2B). Therefore, a short-range object positioned behind the character can be easily observed stereoscopically. Specifically, if the inter-camera distance DS remains long (see FIG. 2C) when the character has looked back at a short-range object positioned behind the character, it may be difficult to observe the short-range object due to a flicker. According to this embodiment, such a situation can be prevented.

When an enemy character has appeared in front of the character in a long-distance scene, the stereoscopic effect can be appropriately controlled depending on the game situation by setting the inter-camera distance DS based on the positional relationship between the character and the enemy character. When an obstacle object has been positioned between the virtual camera and the character, the presence of the obstacle object can be detected based on the position of the virtual camera or the character and the position of the obstacle object, and the inter-camera distance DS can be reduced, for example. Therefore, the inter-camera distance DS that has been set corresponding to a distant object can be changed corresponding to the obstacle object (i.e., short-range object), so that a stereoscopic image that does not give the player the wrong impression can be generated.

2.2 Setting of Inter-Camera Distance Based on Map Information

A method of setting the inter-camera distance based on map information is described below as an example of the method of setting the inter-camera distance based on the position information about the character or the like.

In FIG. 3A, a map that includes a plurality of map blocks MB1, MB2, . . . , and MBN is provided on a game field (object space) where the character CH moves. In FIG. 3A, map information is read based on the position of the character CH or the virtual camera VC. Specifically, a map block corresponding to the position of the character CH or the virtual camera VC is specified, and map information linked to the specified map block is read. The inter-camera distance DS is controlled based on the read map information.

As shown in FIG. 3B, the position coordinates (X, Z) of the vertex of each map block and height information (H) are linked to each of the map blocks MB1 to MBN. A interpolation process is performed on the height information linked to each vertex based on the position coordinates of the character CH in each map block and the position coordinates of each vertex of the map block to determine the height of the place where the character CH is positioned.

As shown in FIG. 3C, the inter-camera distance DS is increased when it has been determined that the character CH is positioned at a high place. This makes it possible to generate an image with an appropriate stereoscopic setting when the character CH is positioned at a high place. Specifically, an image is generated with a stereoscopic setting that is suitable for looking over a distant view from a high place.

As shown in FIG. 3D, the inter-camera distance DS is reduced when it has been determined that the character CH is positioned at a low place. This makes it possible to generate an image with an appropriate stereoscopic setting when the character CH is positioned at a low place. Specifically, it is likely that a short-range object is present near the character CH when the character CH is positioned at a low place. In this case, an image of the short-range object is displayed with a natural stereoscopic effect.

In FIGS. 3A to 3D, the inter-camera distance DS is set based on the height information included in the map information. Note that this embodiment is not limited thereto.

For example, map information in which field-of-view state information in each map block is linked to each map block may be provided. The field-of-view state information in the map block where the character or the virtual camera is positioned may be read, and the inter-camera distance DS may be set based on the read field-of-view state information. For example, the inter-camera distance is increased when the field-of-view state is a distant field-of-view state, and is reduced when the field-of-view state is a short-range field-of-view state.

The inter-camera distance may be controlled based on map attribute information included in the map information. For example, when the character is positioned on a water surface map, a short-range object (e.g., plants) is not present under the feet of the character. In this case, a stereoscopic image that enhances the depth of water is generated by increasing the inter-camera distance DS. Alternatively, the inter-camera distance DS may be linked to each map block to control the inter-camera distance DS in each map block.

Figure 4:
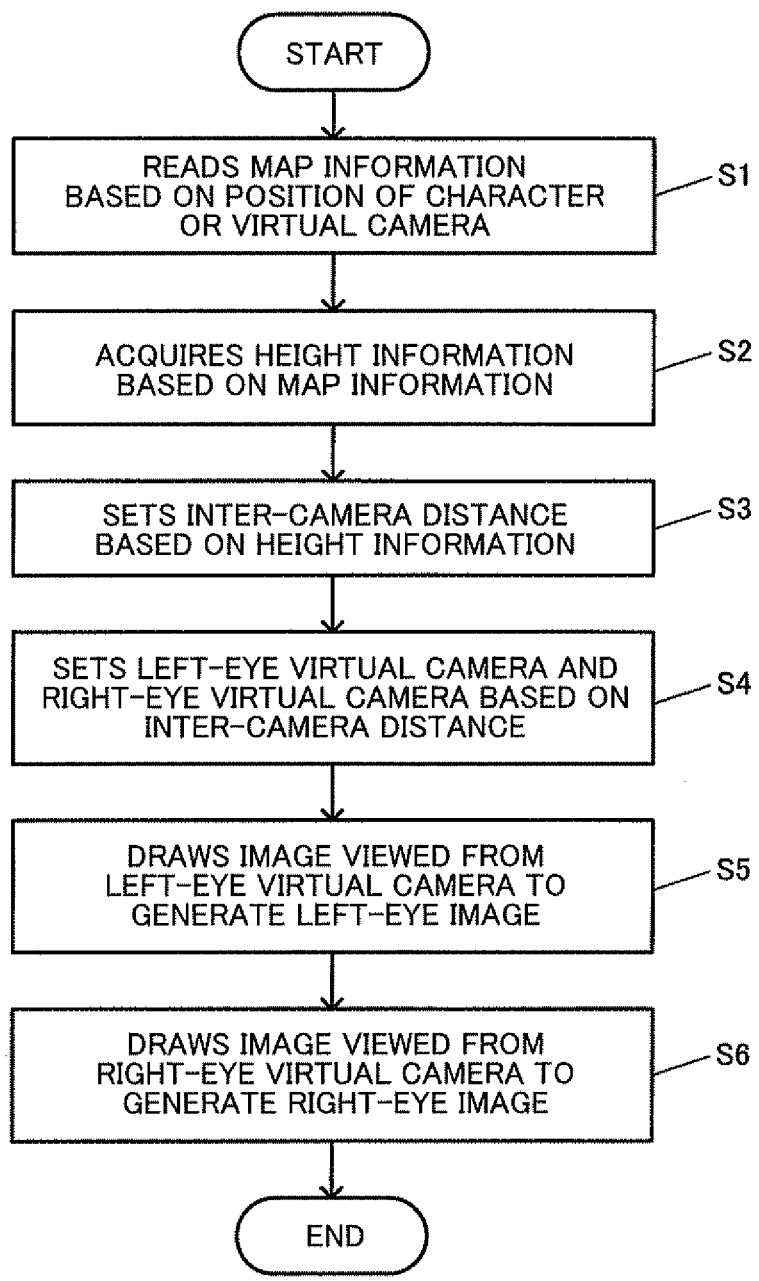
FIG. 4 is a flowchart showing a process that sets an inter-camera distance based on map information.

An example of a process that sets the inter-camera distance based on the map information is described below using a flowchart shown in FIG. 4.

The map information is read based on the position of the character or the virtual camera, and the height information is acquired based on the read map information (steps S1 and S2). For example, a map block corresponding to the position of the character or the virtual camera is specified, and the height information is acquired based on the map information about the specified map block. The inter-camera distance is set based on the acquired height information (step S3). For example, the inter-camera distance is increased when the character CH is positioned at a high place, and is reduced when the character CH is positioned at a low place (see FIGS. 3C and 3D).

The left-eye virtual camera and the right-eye virtual camera are then set based on the inter-camera distance (step S4). For example, the position and the direction of the reference virtual camera that follows the character is determined, and the position and the direction of each of the left-eye virtual camera and the right-eye virtual camera are set based on the position and the direction of the reference virtual camera and the inter-camera distance. An image viewed from the left-eye virtual camera is then drawn to generate a left-eye image (step S5). An image viewed from the right-eye virtual camera is also drawn to generate a right-eye image (step S6). The left-eye image and the right-eye image are output to the display section 190 using image signals (e.g., side-by-side method).

2.3 Setting of Inter-Camera Distance when Target Object has Appeared

A method of setting the inter-camera distance when a target object has appeared is described below as an example of the method of setting the inter-camera distance based on the position information about the character or the like.

In this embodiment, the inter-camera distance is set based on at least one of position information, direction information, and moving state information about a target object targeted by the character. For example, the inter-camera distance is set based on at least one of the position information, the direction information, and the moving state information about the character and at least one of the position information, the direction information, and the moving state information about the target object. Specifically, the inter-camera distance is controlled based on the relative positional relationship, the relative directional relationship, or the relative moving state relationship between the character or the virtual camera and the target object.

Figure 5A:
FIGS. 5A and 5B are views illustrative of a method of setting an inter-camera distance when a target object has appeared.

In FIG. 5A, a target object TOB (i.e., enemy character) has appeared around the character CH. The target object TOB can be controlled based on the position information or the direction information about the character CH (virtual camera). For example, the target object TOB is caused to appear or make a motion when the character CH has approached the emergence area of the target object TOB, or faced toward the target object TOB.

Figure 5B:
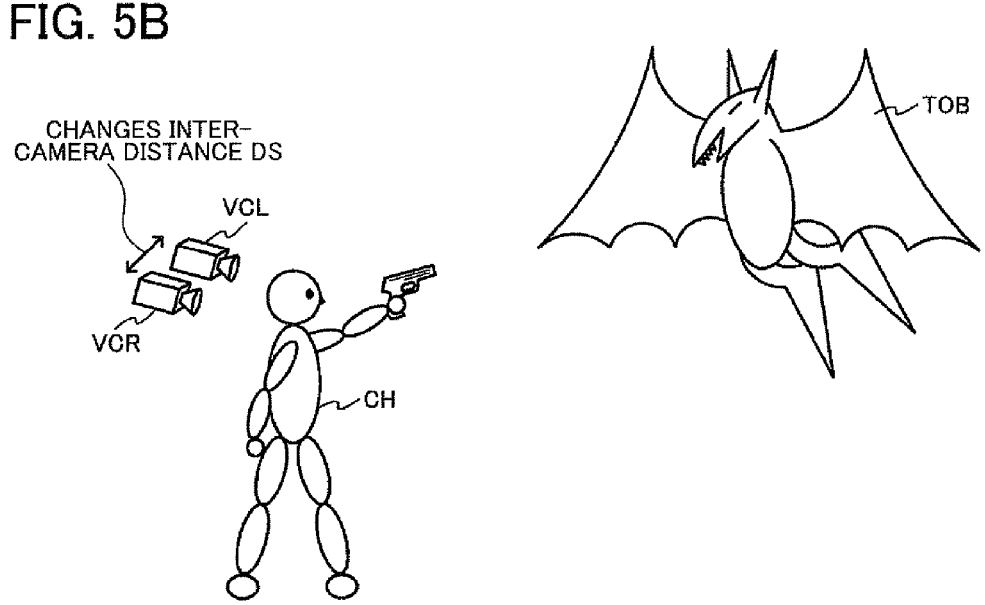

In FIG. 5B, the direction of the character CH (virtual camera) coincides with the direction in which the target object TOB is positioned (present). For example, the target object TOB is positioned within a given direction range including the direction of the character CH. In this case, the inter-camera distance DS is changed, as shown in FIG. 5B. Specifically, the inter-camera distance is increased or reduced.

Specifically, the inter-camera distance DS is increased when the target object TOB is positioned away from the character CH (virtual camera). Therefore, an image of the target object TOB positioned away from the character CH can be displayed with an appropriate stereoscopic effect. Specifically, the player can observe the target object TOB with a stereoscopic effect appropriate for displaying a distant view.

When the character CH has approached the target object TOB, the inter-camera distance DS is reduced. For example, the inter-camera distance DS is reduced as the distance between the character CH and the target object TOB decreases. Therefore, when the character CH has approached the target object TOB, an image of the target object TOB positioned close to the character CH can be displayed with an appropriate stereoscopic effect.

Specifically, a stereoscopic image that mainly focuses on a distant view is displayed when the target object TOB has appeared, so that the player is prompted to focus on the target object TOB positioned away from the character CH. The inter-camera distance DS is reduced when the character CH has approached the target object TOB, so that an image in which the target object TOB suddenly appears at a position close to the character CH can be displayed. It is possible to effectively surprise the player by performing the above stereoscopic representation control. The player can be notified that the character CH gradually approaches the target object TOB by utilizing stereoscopic level control based on the inter-camera distance DS by reducing the inter-camera distance DS as the distance between the character CH and the target object TOB decreases.

Note that the inter-camera distance may be controlled based on the position information, the direction information, or the moving state information about the target object using a method other than the method shown in FIGS. 5A and 5B. For example, the inter-camera distance may be controlled based on relative distance information determined based on the position of the character (virtual camera) and the position of the target object, or may be controlled based on a relative direction relationship determined based on the direction of the character and the direction of the target object. For example, the inter-camera distance may be reduced as the distance between the character and the target object reduces, or may be increased or reduced as the direction of the character becomes parallel to the direction of the target object. The inter-camera distance may be reduced when it has been determined that the moving path (moving state information) of the target object is extending toward the character, or when it has been determined that the moving path (moving state information) of the character is extending toward the target object.

Figure 6:
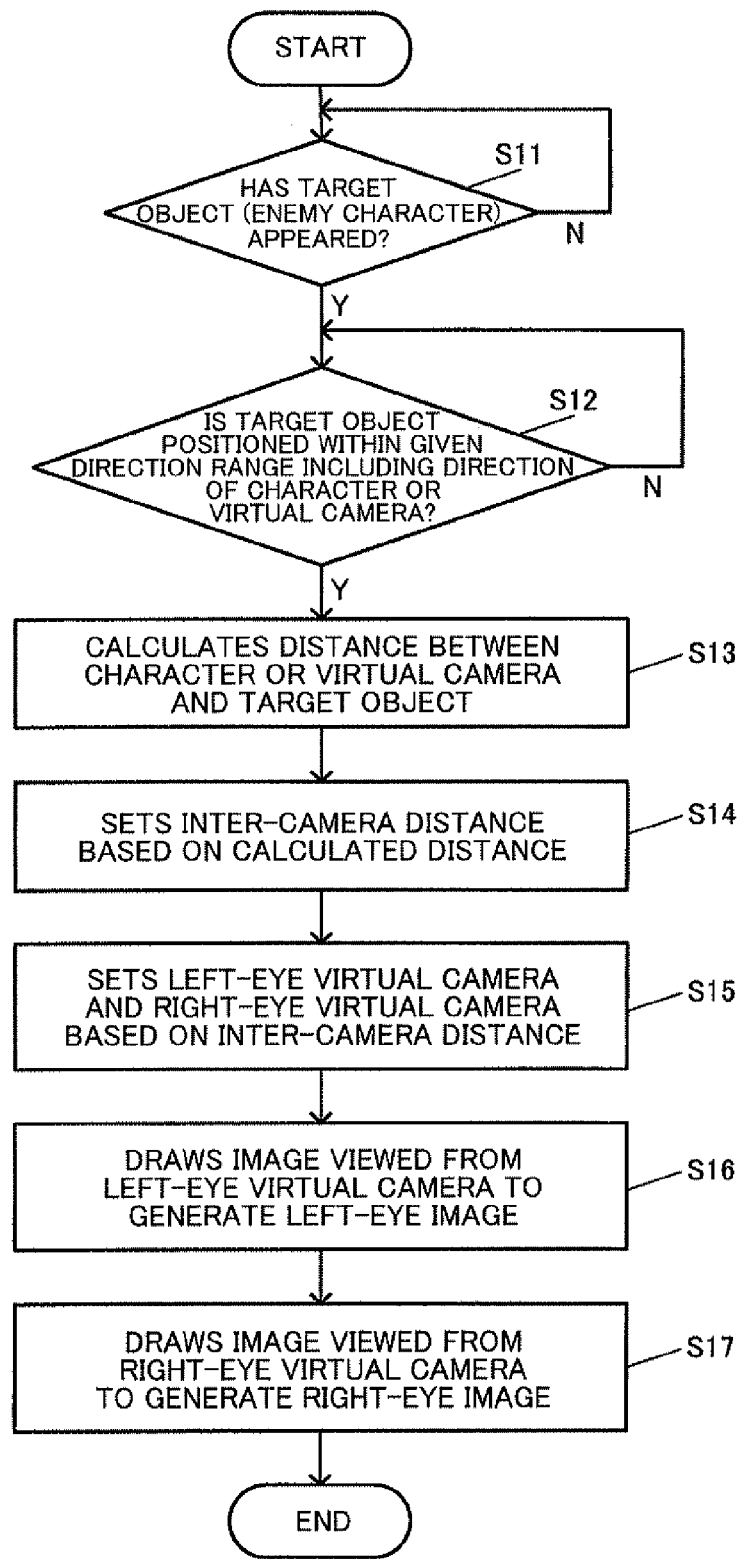
FIG. 6 is a flowchart showing a process that sets an inter-camera distance when a target object has appeared.

An example of a process that sets the inter-camera distance when the target object has appeared is described below using a flowchart shown in FIG. 6.

Whether or not the target object (enemy character) has appeared is determined (step S11). For example, it is determined that the target object has appeared when the position of the character has entered the emergence area of the target object.

Whether or not the target object is positioned within a given direction range including the direction of the character or the virtual camera is then determined (step S12). For example, whether or not the target object is positioned within a direction range of $-\alpha$ to $\alpha$ degrees (e.g., $\alpha=20$) around the direction of the character or the virtual camera is determined. When the target object is positioned within the direction range, the distance between the character or the virtual camera and the target object is calculated (step S13). The inter-camera distance is set based on the calculated distance (step S14). For example, the inter-camera distance is increased when the calculated distance is longer than a given reference distance (distance threshold value), and is reduced when the calculated distance is shorter than the given reference distance. Alternatively, the inter-camera distance is gradually reduced as the distance between the character or the virtual camera and the target object decreases.

The left-eye virtual camera and the right-eye virtual camera are set based on the inter-camera distance to generate a left-eye image and a right-eye image (steps S15 to S17).

2.4 Setting of Inter-Camera Distance when Obstacle Object is Positioned Between Virtual Camera and Character A method of setting the inter-camera distance when an obstacle object is positioned between the virtual camera and the character is described below as an example of the method of setting the inter-camera distance based on the position information about the character or the like.

Figure 7:
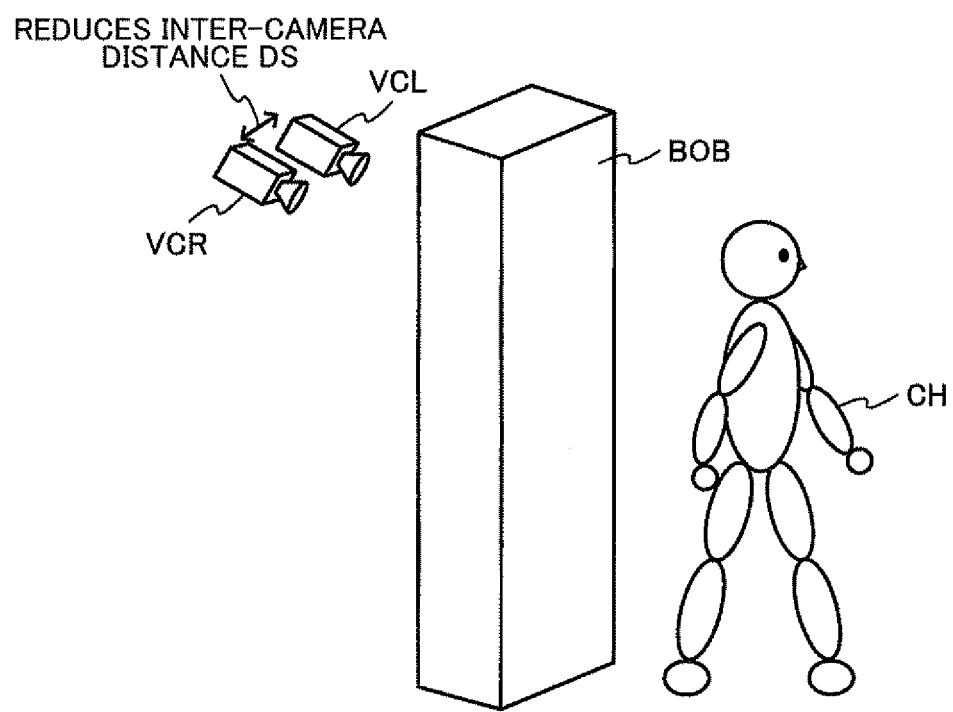
FIG. 7 is a view illustrative of a method of setting an inter-camera distance when an obstacle object is positioned between a virtual camera and a character.

In FIG. 7, an obstacle object BOB is positioned between the virtual camera (VC, VCL, VCR) and the character CH so that the line of sight of the virtual camera is blocked. In this case, the stereoscopic effect on the obstacle object BOB that has appeared in front of the player may be too high if the inter-camera distance DS is long, so that the player may be given a wrong impression.

In this embodiment, whether or not the obstacle object BOB has been positioned between the virtual camera and the character CH is detected based on the position information about the virtual camera and the position information about the character CH. When it has been detected that the obstacle object BOB has been positioned between the virtual camera and the character CH, the inter-camera distance DS is reduced. For example, the inter-camera distance DS is set to a short distance that is provided for the obstacle object BOB.

Specifically, since the inter-camera distance DS is set to a distance appropriate for the obstacle object BOB even if the obstacle object BOB has suddenly appeared in front of the player, it is possible to prevent a situation in which the stereoscopic effect on the obstacle object BOB gives the player the wrong impression.

Figure 8:
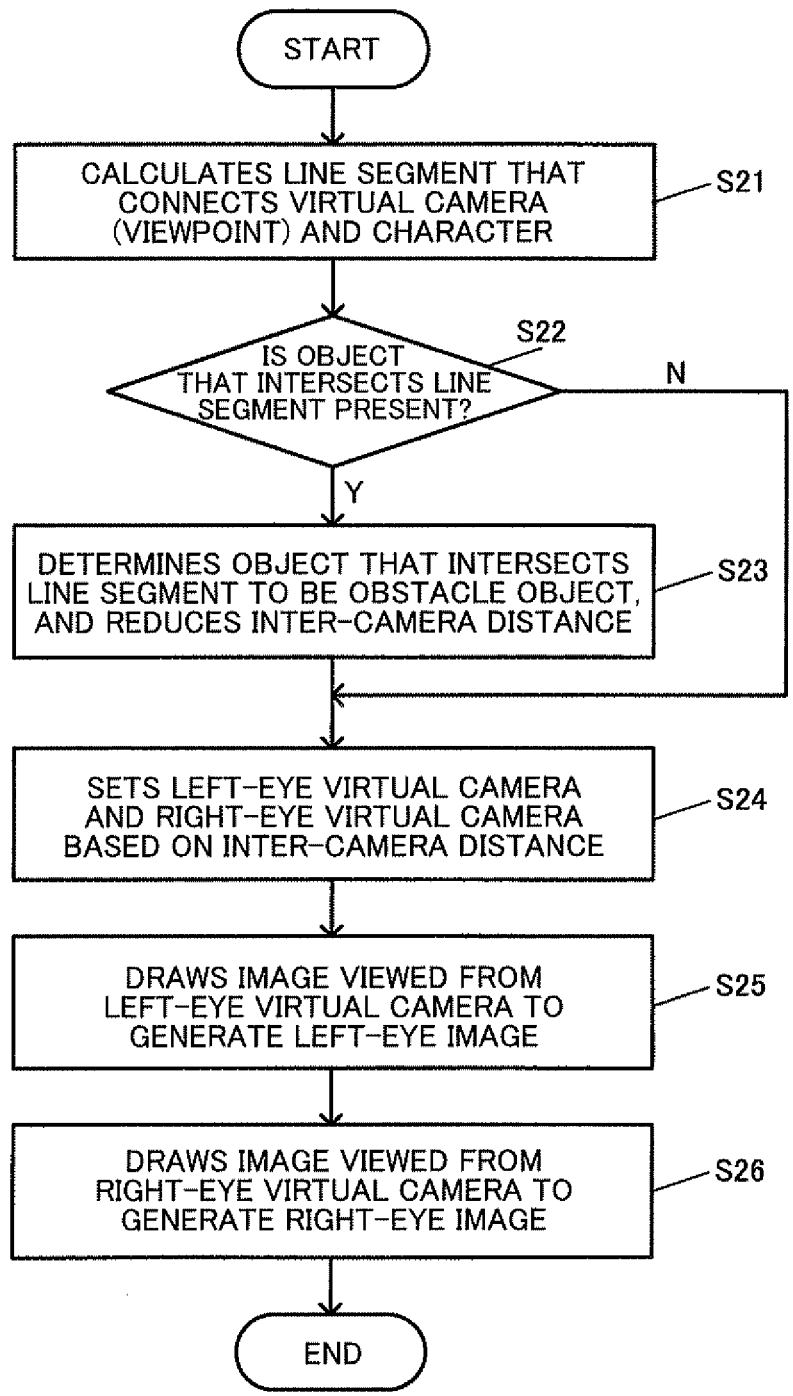
FIG. 8 is a flowchart showing a process that sets an inter-camera distance when an obstacle object is positioned between a virtual camera and a character.

An example of a process that sets the inter-camera distance when an obstacle object is positioned between the virtual camera and the character is described below using a flowchart shown in FIG. 8.

A line segment that connects the virtual camera (viewpoint) and the character is calculated (step S21). For example, a line segment that connects the position of the virtual camera and a representative position of the character is calculated. Whether or not an object that intersects the line segment is present is then determined (step S22).

When an object that intersects the line segment is present, the object that intersects the line segment is determined to be the obstacle object, and the inter-camera distance is reduced (see FIG. 7) (step S23).

The left-eye virtual camera and the right-eye virtual camera are set based on the inter-camera distance to generate a left-eye image and a right-eye image (steps S24 to S26).

2.5 Setting of Inter-Camera Distance Based on Target Point

A method of setting the inter-camera distance based on a target point is described below as an example of the method of setting the inter-camera distance based on the position information about the character or the like.

It may be desirable to guide the character (player) to a given point on the game field during the game. For example, a three-dimensional game is designed so that a character can arbitrarily move in a three-dimensional space. However, a target point (i.e., destination of the character) may be set, and the character may be guided to the target point so that the game proceeds smoothly. Specifically, the character can be guided along a path desired by the game creator. In this case, it is desirable to guide the character so that the player does not become aware that the character is guided.

In this embodiment, when the target point has been set in the object space (game space), the character (virtual camera) is guided to the target point by controlling the inter-camera distance.

In FIG. 9A, a target point TG is set to a secret door, for example. The target point TG is a point that is targeted by the character CH as to movement. The player can proceed to the next game stage when the character CH has passed through the secret door to which the target point TG is set. Therefore, it is important to guide the character CH to the target point TG so that the player is not given a wrong impression.

In FIG. 9B, the inter-camera distance DS is increased when the target point TG has been set, so that stereoscopic representation that mainly focuses on a distant view is displayed. Therefore, the player can easily recognize the secret door positioned at a long distance away from the character CH due to an appropriate stereoscopic effect, so that the player is prompted to focus on the target point TG (secret door).

As shown in FIG. 9C, the inter-camera distance DS is reduced as the character CH (virtual camera) approaches the target object TG. The inter-camera distance DS may be reduced as the character CH (virtual camera) approaches the target object TG on condition that the direction of the character CH (virtual camera) faces the target point TG.

Specifically, the inter-camera distance DS changes when the character CH approaches the target point TG based on an operation performed by the player after the target point TG has appeared. Since an image of the secret door is displayed by appropriate stereoscopic representation based on the distance between the secret door and the character CH, the character CH can be more effectively guided to the target point TG. For example, the inter-camera distance DS is not changed when the character CH has moved in a direction other than the direction of the target point TG, but is changed when the character CH has moved in the direction of the target point TG. This makes it possible to guide the character CH in the direction of the target point TG (i.e., the direction in which the inter-camera distance DS changes). Therefore, the character CH can be guided to the target point TG by effectively controlling the inter-camera distance DS.

Note that the inter-camera distance may be controlled to guide the character or the virtual camera to the target point using a method other than the method described with reference to FIGS. 9A to 9C. For example, the inter-camera distance may be controlled to guide the character or the virtual camera to the target point based on the relative positional relationship between the character or the virtual camera and the target point, the relative directional relationship between the character or the virtual camera and the target point, the distance between the character or the virtual camera and the target point, or the like. When a plurality of target points have been set, a target point corresponding to the direction of the character or the virtual camera is selected from the plurality of target points. The inter-camera distance is set based on the distance between the selected target point and the character or the virtual camera, for example.

Figure 10:
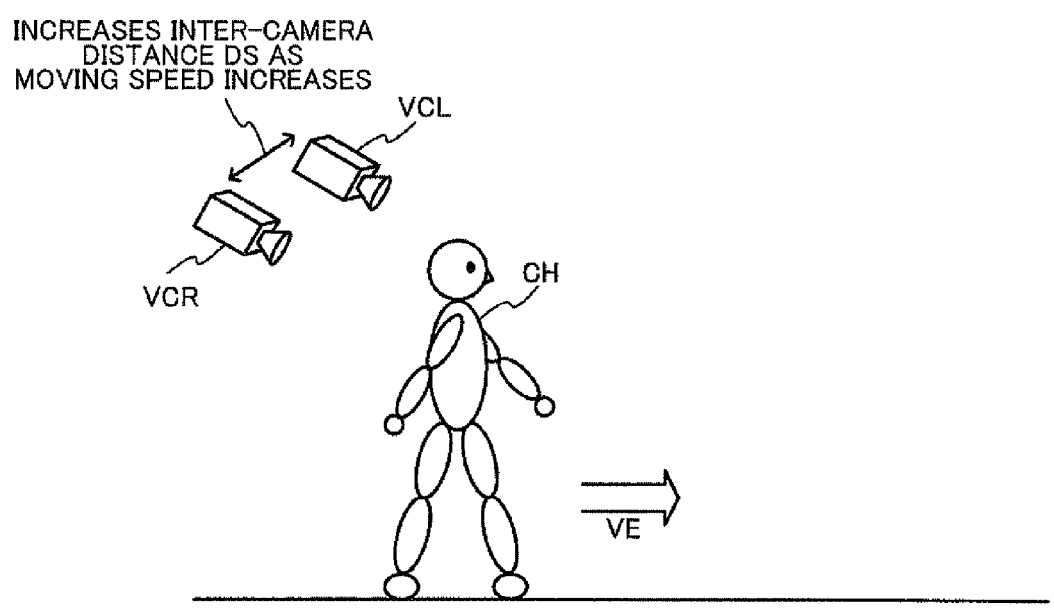
FIG. 10 is a view illustrative of a method of setting an inter-camera distance based on the moving speed of a character.

The inter-camera distance may be controlled based on the moving state information about the character or the virtual camera. In FIG. 10, a moving speed VE of the character CH (virtual camera) is detected, and the inter-camera distance DS is set based on the detected moving speed VE, for example. Specifically, the inter-camera distance DS is increased as the moving speed VE of the character CH increases.

Therefore, since a distant view is displayed with an appropriate stereoscopic effect when the character CH moves quickly, the character CH can be guided to the target point or the like that is positioned away from the character CH. Alternatively, the inter-camera distance DS may be increased when it has been determined that the player has continuously tilted the operation lever or the like of the operation section in a given direction so that the character CH continuously moves in a given direction. In this case, a distant object that is present in the moving direction of the character CH that moves based on the operation performed by the player is displayed by an appropriate stereoscopic image. This makes it possible to display a smooth and realistic stereoscopic image that gives the player the impression that the character CH (player) approaches the distant object.

Figure 11:
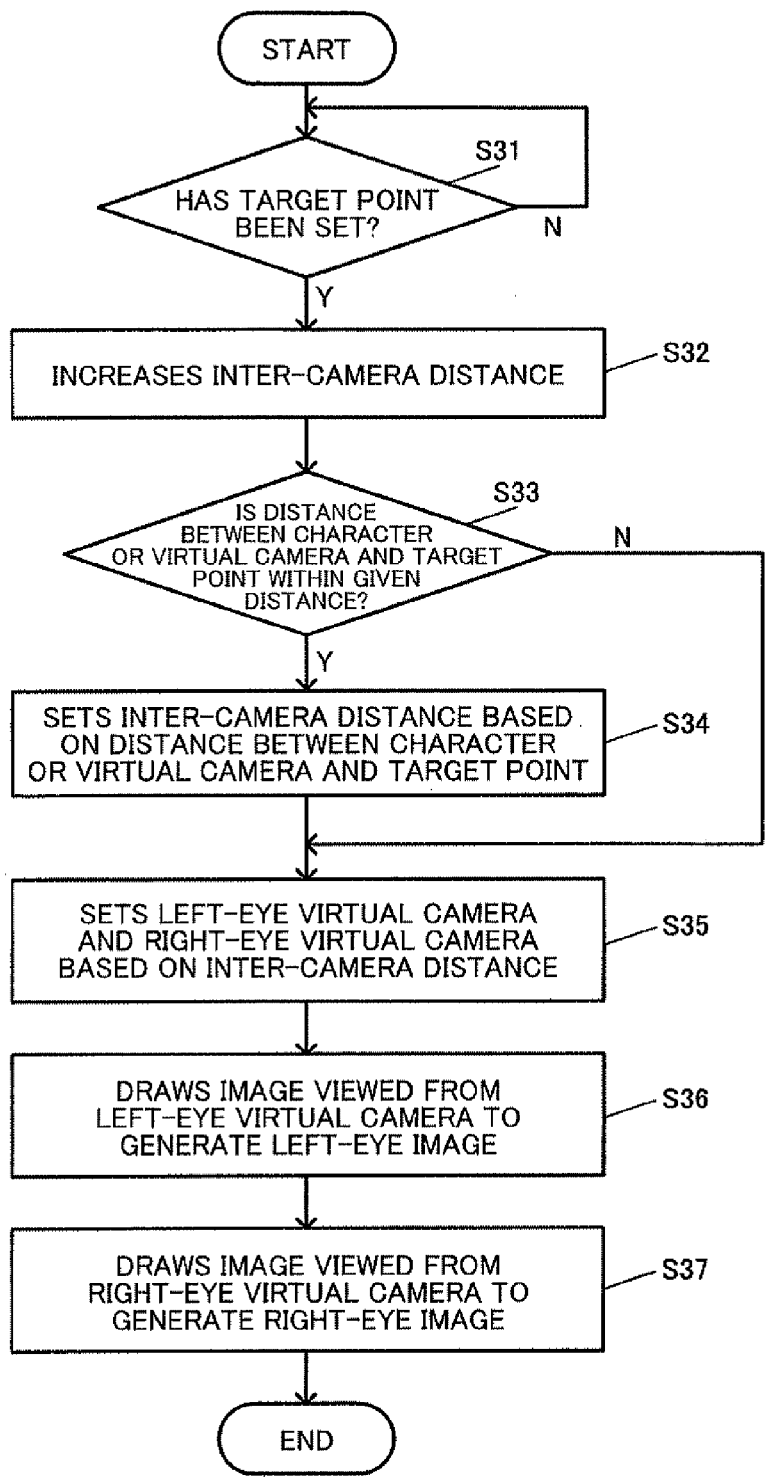
FIG. 11 is a flowchart showing a process that sets an inter-camera distance based on a target point.

An example of a process that sets the inter-camera distance based on the target point is described below using a flowchart shown in FIG. 11.

Whether or not the target point has been set is determined (step S31). When the target point has been set, the inter-camera distance is increased as described with reference to FIGS. 9A and 9B (step S32).

Whether or not the distance between the character or the virtual camera and the target point is within a given distance is then determined (step S33). When the distance between the character or the virtual camera and the target point is within the given distance, the inter-camera distance is set based on the distance between the character or the virtual camera and the target point as described with reference to FIG. 9C (step S34). For example, the inter-camera distance DS is reduced as the distance between the character or the virtual camera and the target point decreases.

The left-eye virtual camera and the right-eye virtual camera are then set based on the inter-camera distance to generate a left-eye image and a right-eye image (steps S35 to S37).

2.6 Setting of Inter-Camera Distance Based on Presence Historical Information

A method of setting the inter-camera distance based on presence historical information is described below as an example of the method of setting the inter-camera distance based on the position information about the character or the like.

When playing a three-dimensional game, the player observes the surrounding situation in a different way depending on whether or not the player has visited the current place for the first time.

When the player has visited the current place for the first time (i.e., the player is not familiar with the current place), it is desirable that a short-range object positioned near the character operated by the player is displayed by appropriate stereoscopic representation.

When the player has visited the current place many times (i.e., the player is familiar with the current place), a short-range object need not necessarily be displayed by appropriate stereoscopic representation, and it is desirable to display a distant-view image.

Therefore, the inter-camera distance may be set based on the presence historical information about the character (virtual camera) in each place in the object space. For example, the inter-camera distance is reduced in a place where it has been determined that the presence frequency of the character (virtual camera) is low based on the presence historical information. On the other hand, the inter-camera distance is increased in a place where it has been determined that the presence frequency of the character (virtual camera) is high based on the presence historical information.

Figures 12A, 12B:
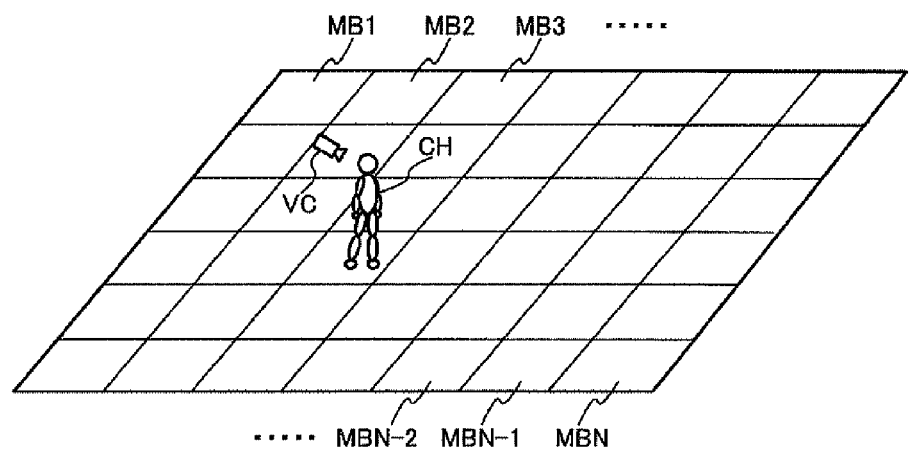
FIGS. 12A and 12B are views illustrative of a method of setting an inter-camera distance based on presence historical information.

As shown in FIG. 12A, the map of the game field where the character CH moves is divided into a plurality of map blocks MB1 to MBN. A map block where the character CH (virtual camera VC) is positioned is specified from the plurality of map blocks MB1 to MBN.

As shown in FIG. 12B, presence historical information in which the presence frequency of the character CH is linked to each map block is provided. The presence frequency linked to the map block where the character CH is positioned is read based on the presence historical information. Whether or not the character CH has visited (has been positioned in) the map block for the first time can thus be determined.

In FIG. 12B, the presence frequency linked to the map block MB1 is "0". Therefore, when the character CH is positioned in the map block MB1, it is determined that the character CH has visited the map block MB1 for the first time. The presence frequency linked to the map block MB3 is "6". Therefore, when the character CH is positioned in the map block MB3, it is determined that the character CH has visited the map block MB3 many times.

When it has been determined that the character CH has visited the current map block (e.g., MB1) for the first time, the inter-camera distance is reduced on the assumption that the player is not familiar with the surrounding situation. Therefore, the player can observe a short-range object positioned around the character CH with an appropriate stereoscopic effect, and does not feel uneasy.

When it has been determined that the character CH has visited the current map block (e.g., MB3) many times, the inter-camera distance is increased on the assumption that the player is familiar with the surrounding situation. Therefore, the player can observe a distant object positioned away from the character CH with an appropriate stereoscopic effect rather than a short-range object positioned around the character CH, and can smoothly play the game.

Note that the inter-camera distance may be set based on the presence historical information using a method other than the method described with reference to FIGS. 12A and 12 13. For example, the presence historical information is not limited to information in which the presence frequency is linked to the map block indicated by the map information (see FIG. 12B), but may be information in which the presence frequency is linked to another type of information. The inter-camera distance may be increased in a place where the presence frequency is low, and may be reduced in a place where the presence frequency is high. The inter-camera distance may be controlled while reflecting the position, the direction, or the moving state of the character, the position or the direction of the target object or the target point, or the like in addition to the presence frequency.

An example of a process that sets the inter-camera distance based on the presence historical information is described below using a flowchart shown in FIG. 13.

The map information is read based on the position of the character or the virtual camera (step S41). The presence frequency is acquired based on the presence historical information linked to the map information (step S42). For example, the map block indicated by the map information is specified based on the position of the character or the like, and the presence frequency corresponding to the specified map block is read (see FIGS. 12A and 12B).

The presence historical information is then updated (step S43). For example, the presence frequency linked to the specified map block is incremented by one.

The inter-camera distance is set based on the acquired presence frequency (step S44). For example, the inter-camera distance is reduced when the presence frequency is low so that a short-range object can be easily observed. The inter-camera distance is increased when the presence frequency is high so that a distant object can be easily observed.

The left-eye virtual camera and the right-eye virtual camera are set based on the inter-camera distance to generate a left-eye image and a right-eye image (steps S45 to S47).

2.7 Setting of Inter-Camera Distance Based on Accessory Object, Motion, or Event A method of setting the inter-camera distance based on an accessory object, a motion, an event, or the like is described below.

For example, the inter-camera distance may be set based on an object attached to the character. As shown in FIG. 14A, a table in which the inter-camera distance (e.g., DS1, DS2, and DS3) is linked to an accessory object (e.g., EOB1, EOB2, and EOB3) is provided, for example. When the character is equipped with the accessory object EOB1, the inter-camera distance between the left-eye virtual camera and the right-eye virtual camera corresponding to the character is set to DS1. When the character is equipped with the accessory object EOB2 or EOB3, the inter-camera distance is set to DS2 or DS3, respectively.

This makes it possible to set the inter-camera distance corresponding to the accessory object of the character, and generate a stereoscopic image.

In FIG. 14B, the character CH is equipped with the short-range attack object EOB1 (e.g., knife or pistol) as a weapon object. In this case, the inter-camera distance DS is reduced to implement short-range stereoscopic representation on the assumption that the character CH prepares for a close battle. This makes it possible for the player to easily attack an enemy positioned at a short distance away from the character CH.

In FIG. 14C, the character CH is equipped with the long-range attack object EOB2 (e.g., rifle) as a weapon object. In this case, the inter-camera distance DS is increased to enhance the stereoscopic depth on the assumption that the character CH (player) aims at an enemy positioned at a long distance away from the character CH. This makes it possible for the player to easily attack an enemy positioned at a long distance away from the character CH.

Note that the accessory object used to change the inter-camera distance is not limited to the weapon object shown in FIGS. 14B and 14C. For example, a long-range observation item object (e.g., binoculars or telescope) and a short-range observation item object (e.g., magnifying glass) may be provided. The inter-camera distance may be increased when the character CH is equipped with the long-range observation item object, and may be reduced when the character CH is equipped with the short-range observation item object.

The inter-camera distance may be controlled based on the motion of the character. As shown in FIG. 14D, a table in which the inter-camera distance (e.g., DS1, DS2, and DS3) is linked to a motion number (e.g., NMS1, NMS2, and NMS3) is provided, for example. When the motion number of the reproduction target motion of the character is NMS1, the inter-camera distance is set to DS1. When the motion number is NMS2, the inter-camera distance is set to DS2.

For example, when the motion of the character is a jump motion, it may be assumed that the character observes a distant view. In this case, stereoscopic representation that enhances the stereoscopic depth is implemented by increasing the inter-camera distance DS.

When the motion of the character is a squat motion, it may be assumed that the character observes a near view. In this case, stereoscopic representation appropriate for a short-range object (near view) is implemented by reducing the inter-camera distance DS.

Specifically, since a stereoscopic image is generated using an inter-camera distance appropriate for the field-of-view state corresponding to the motion of the character, more intelligent inter-camera distance control can be implemented.

The inter-camera distance may be controlled based on the motion of the character using a method other than the method described with reference to FIG. 14D. For example, the inter-camera distance may be changed based on the motion frame of the motion of the character. For example, when the viewpoint of the character is set at a high position in the first-half motion frame, and is set at a low position in the second-half motion frame, the inter-camera distance DS is increased in the first-half motion frame so that the stereoscopic depth is enhanced, and is reduced in the second-half motion frame so that short-range stereoscopic representation is implemented. This makes it possible to more finely control the inter-camera distance.

The inter-camera distance may be controlled based on the type of event that has been generated. For example, the inter-camera distance is changed when a given event has been generated in connection with the character. Specifically, the inter-camera distance is repeatedly increased and reduced.

Figure 15A:
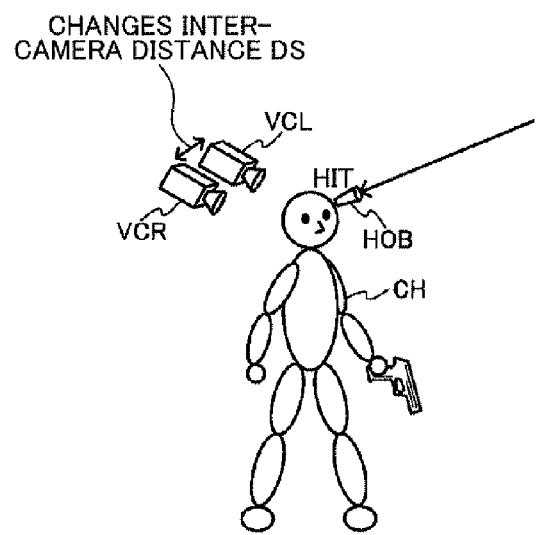
FIGS. 15A and 15B are views illustrative of a method of changing an inter-camera distance when a hit event has been generated.

In FIG. 15A, an event in which a hitting object (e.g., bullet) hits the character CH has been generated. In this case, the inter-camera distance DS is changed in a given cycle. Specifically, the inter-camera distance DS is cyclically changed around a reference distance DSR (described later), and the amplitude of the change in the inter-camera distance DS is gradually reduced, as shown in FIG. 15B.

Therefore, the inter-camera distance DS increases and decreases when the character CH operated by the player has been severely damaged, so that a decrease in concentration or dizziness of the character CH can be displayed. Specifically, the stereoscopic level (stereoscopic vision) changes when the inter-camera distance DS has changed. Therefore, an effect in which dizziness occurs for a given period due to a hit by the hitting object HOB (e.g., bullet) can be created.

Figure 15B:
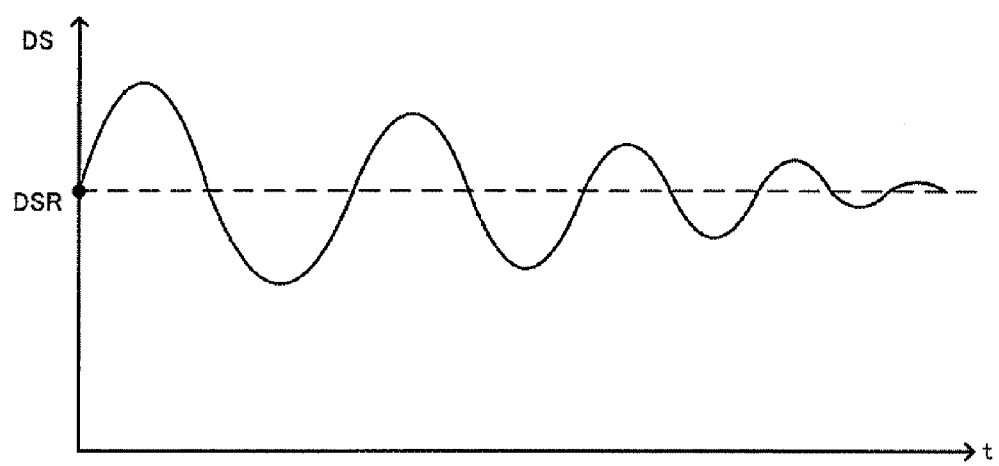
Figure 16:
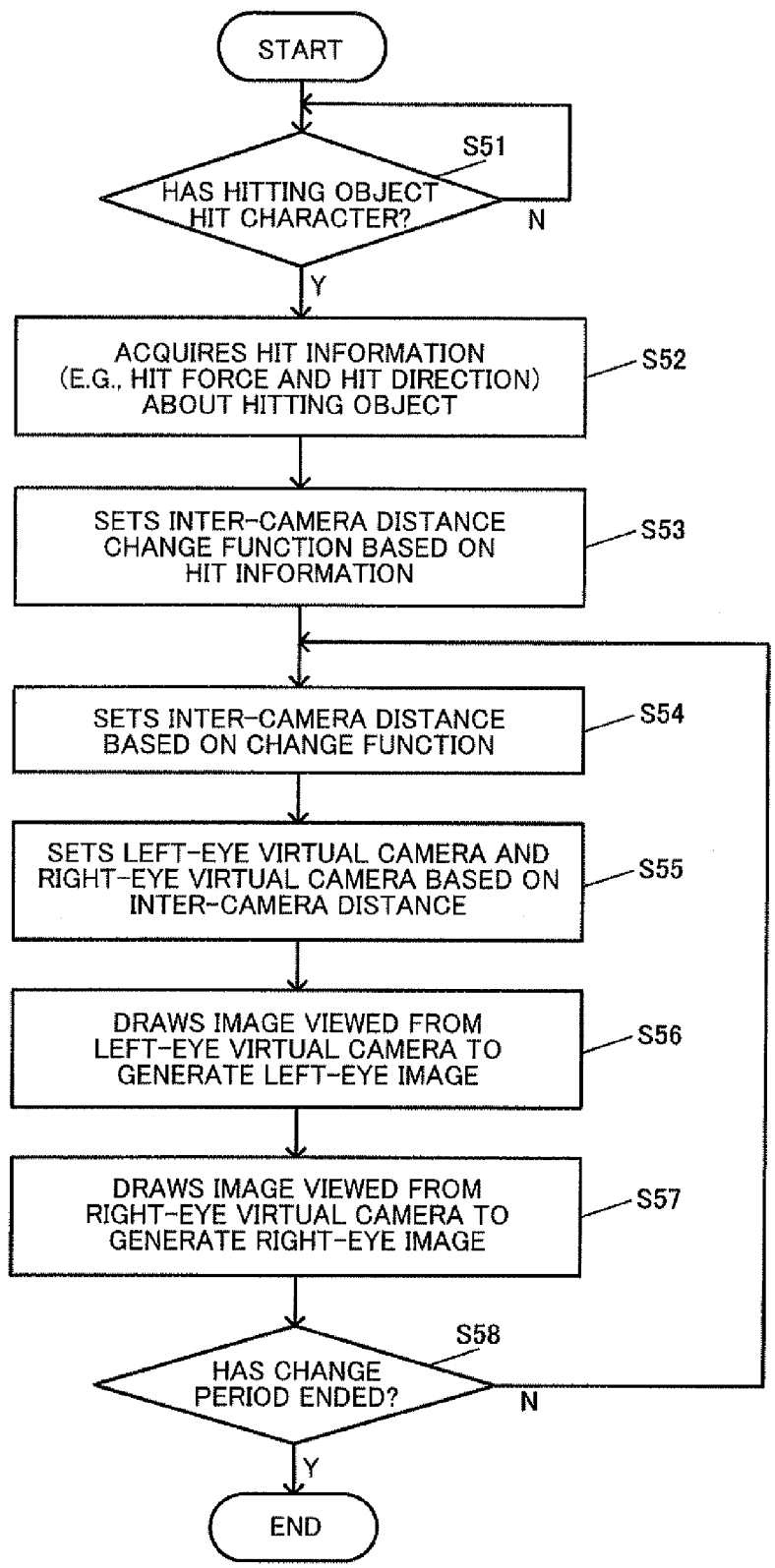
FIG. 16 is a flowchart showing a process that changes an inter-camera distance when a hit event has been generated.

An example of the inter-camera distance change process described with reference to FIGS. 15A and 15B is described below using a flowchart shown in FIG. 16.

Whether or not the hitting object has hit the character is determined (see FIG. 15A) (step S51). When it has been determined that the hitting object has hit the character, hit information (e.g., hit force and hit direction) about the hitting object is acquired (step S52).

An inter-camera distance change function (see FIG. 15B) is then set based on the acquired hit information (step S53). Specifically, the amplitude, the change cycle, the change period, and the like of the change function are set. For example, the change function is set so that the amplitude, the change cycle, or the change period increases when the hit force is high, or when the hit direction is the front direction.

The inter-camera distance is set based on the change function (step S54). Specifically, the inter-camera distance at each time is acquired and set based on the change function.

The left-eye virtual camera and the right-eye virtual camera are set based on the inter-camera distance to generate a left-eye image and a right-eye image (steps S55 to S57).

Whether or not the change period of the change function has ended is then determined (step S58). When the change period has not ended, the process is performed again from the step S54. When the change period has ended, the process is terminated.

2.8 Setting of Inter-Camera Distance Based on Time Parameter

A method of setting the inter-camera distance based on a time parameter is described below.

A human can observe an object stereoscopically due to physiological functions (e.g., binocular disparity (i.e., a difference in retina image location due to spatial separation between the right eye and the left eye), convergence (i.e., inward eye movement), and focus adjustment (i.e., the thickness of the crystalline lens responds to the distance from an object)). A human recognizes a stereoscopic effect by processing these physiological functions in the brain.

When implementing such a stereoscopic effect using a stereoscopic image, the player observes the stereoscopic image in a field-of-view state (e.g., the player wears glasses) differing from a normal state. Therefore, the player may be given a wrong impression if a stereoscopic image at a high stereoscopic level is displayed when the player starts playing the game. Specifically, the stereoscopic effect using a stereoscopic image is initially more effective, and it may be difficult for the player to observe the stereoscopic image if the stereoscopic effect is too high.

The player gradually becomes accustomed to the stereoscopic effect with the passage of time. The stereoscopic effect gradually decreases when the player has become accustomed to the stereoscopic effect. Therefore, the player is not given a wrong impression if the stereoscopic image is displayed with a higher stereoscopic effect.

In this embodiment, a game-related time parameter is acquired. For example, the frame update count after the game has started is counted to acquire an elapsed time parameter that indicates the time elapsed after the game has started. Alternatively, the frame update count is counted during a period in which the player plays the game, and the count values are summed up to acquire a cumulative play time parameter that indicates the cumulative play time of the player as the elapsed time parameter. When the image generation system includes a timer that measures the time, the elapsed time parameter or the cumulative play time parameter may be calculated based on time information from the timer.

The inter-camera distance between the left-eye virtual camera and the right-eye virtual camera is set based on the acquired time parameter to generate a left-eye image and a right-eye image. For example, the inter-camera distance is increased as the time indicated by the elapsed time parameter (i.e., time parameter) increases. Alternatively, the inter-camera distance is increased as the cumulative play time indicated by the cumulative play time parameter (i.e., time parameter) increases.

Figure 17A:
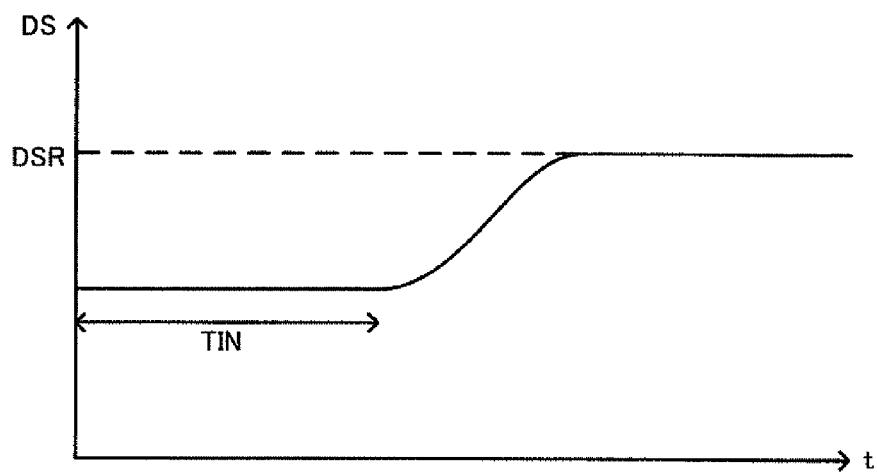
FIGS. 17A and 17B are views illustrative of a method of setting an inter-camera distance based on a time parameter.
Figure 17B:
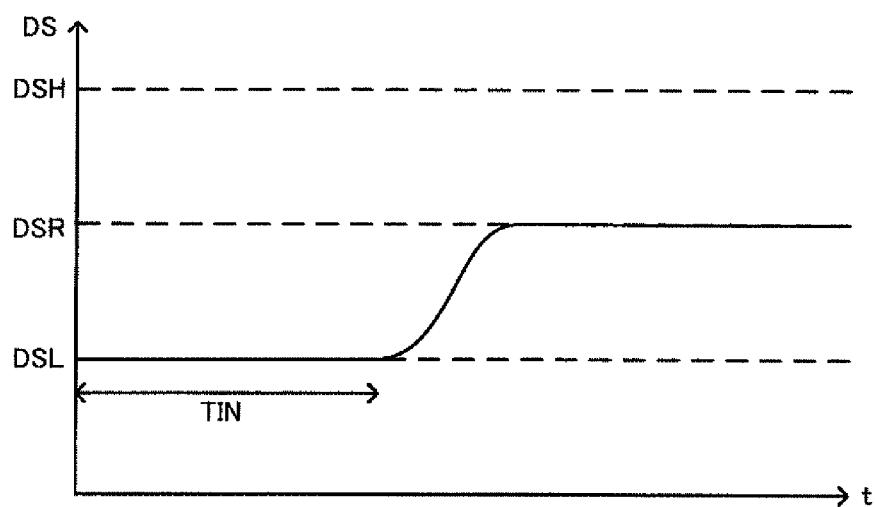

FIGS. 17A and 17B show examples of inter-camera distance control based on the time parameter.

In FIG. 17A, the inter-camera distance DS is set to a short distance (e.g., lower-limit distance) until a given period TIN elapses after the game has started, for example. The inter-camera distance DS is increased when the given period TIN has elapsed after the game has started. For example, the inter-camera distance DS is brought closer to the reference distance DSR as the time indicated by the time parameter increases.

Specifically, the inter-camera distance DS can be increased to the reference distance DSR after the given period TIN has elapsed (i.e., after the player has become accustomed to the stereoscopic field-of-view environment). This prevents a situation in which the player is given a wrong impression due to a high stereoscopic effect when the player starts playing the game. When the player has become accustomed to stereoscopic vision after the given period TIN has elapsed, a stereoscopic image can be displayed to the player by setting the inter-camera distance DS to the reference distance DSR at which a standard stereoscopic effect is obtained.

A lower-limit distance DSL, the reference distance DSR, and an upper-limit distance DSH of the inter-camera distance DS (see FIG. 17B) can be set by the player using the game environment setting screen or the like (described later). The inter-camera distance DS is set to the lower-limit distance DSL until the given period TIN elapses after the game has started.

The inter-camera distance DS is increased when the given period TIN has elapsed, and is set to the reference distance DSR (standard inter-camera distance). When changing the inter-camera distance DS using the methods described with reference to FIGS. 2A to 16, the inter-camera distance DS is controlled so that the upper-limit distance DSH is not exceeded. For example, the inter-camera distance DS is controlled so that the upper-limit distance DSH is not exceeded when increasing the inter-camera distance DS as shown in FIGS. 3C and 9B. The inter-camera distance DS is also controlled so that the upper-limit distance DSH is not exceeded when changing the inter-camera distance DS to display dizziness or the like as shown in FIG. 15B. This makes it possible to change the inter-camera distance DS while reflecting the player's will to a certain extent.

The operation information input by the player using the operation section 160 may be monitored, and the inter-camera distance may be controlled based on the monitoring result.

For example, the inter-camera distance DS is increased as the time indicated by the time parameter increases (see FIGS. 17A and 17B). The inter-camera distance is reduced when it has been determined that the operation information has not been input for a given period TNOP. The inter-camera distance DS is increased when the operation information has been input thereafter, and is set to the reference distance DSR.

Specifically, it is considered that the player suspends game play and takes a rest when the operation information has not been input using the operation section 160 (controller) for a long period (TNOP). Therefore, the stereoscopic effect is reduced by reducing the inter-camera distance DS. For example, the inter-camera distance DS is set to the lower-limit distance DSL shown in FIG. 17B. Specifically, the inter-camera distance DS is set to the lower-limit distance DSL until the player plays the game again. This prevents a situation in which the player is given a wrong impression due to a high stereoscopic effect when the player plays the game again.

When the player has started the game again, and the operation information has been detected, the inter-camera distance DS is increased after a given period has elapsed, and is set to the reference distance DSR. The standard stereoscopic effect due to the reference distance DSR is thus restored. Therefore, the player can enjoy the game with stereoscopic vision in the field-of-view state that has been used before suspending the game.

The input frequency of the operation information input from the operation section 160 operated by the player may be monitored, and the inter-camera distance may be controlled based on the monitoring result. Specifically, the inter-camera distance is reduced when it has been determined that the input frequency of the operation information is higher than a reference frequency.

Figure 18A:
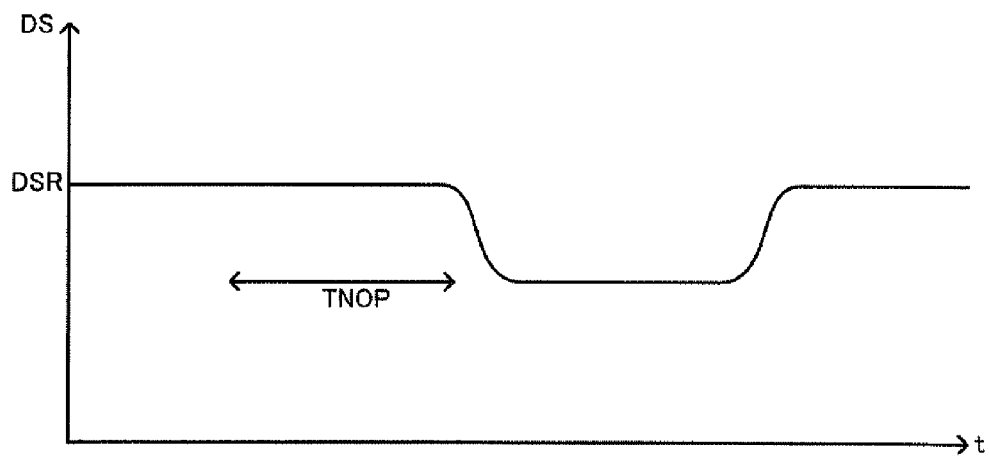
FIGS. 18A and 18B are views illustrative of a method of setting an inter-camera distance based on the operation state of an operation section.
Figure 18B:
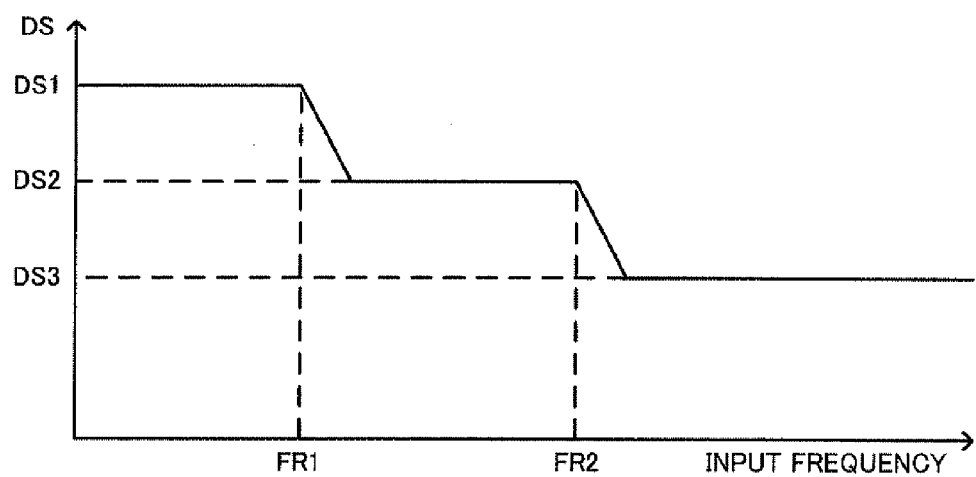

FIG. 18B shows a setting example of the inter-camera distance DS based on the input frequency. In FIG. 18B, the inter-camera distance DS is set to DS1 when the input frequency is lower than a first reference frequency FR1. The inter-camera distance DS is set to DS2 (DS2<DS1) when the input frequency is between the first reference frequency FR1 and a second reference frequency FR2, and is set to DS3 (DS3<DS2) when the input frequency is higher than the second reference frequency FR2.

For example, when the input frequency of the operation information input from the operation section 160 operated by the player is high, it may be considered that many enemies or the like are present around the character operated by the player, and the player is desperately operating the operation section 160 in order to deal with the enemies. Therefore, the inter-camera distance DS is reduced (e.g., DS=DS3) so that the enemies present around the character are displayed with an appropriate stereoscopic effect. This makes it possible for the player to observe the enemies present around the character with an appropriate stereoscopic effect, and smoothly proceed with the game.

When the input frequency of the operation information input from the operation section 160 is low, it may be considered that the player is carefully checking a situation around the character. Therefore, the inter-camera distance DS is increased (e.g., DS=DS1) so that a distant view is displayed with an appropriate stereoscopic effect. This makes it possible for the player to observe a distant target and the like with an appropriate stereoscopic effect after defeating the enemies present around the character, and then determine the subsequent operation of the character.

Note that the inter-camera distance may be set based on the input frequency of the operation information input from the operation section 160 in a way differing from the example shown in FIG. 19B. For example, the inter-camera distance may be increased as the input frequency of the operation information input from the operation section 160 increases.

FIGS. 19A and 19B show examples of the game environment setting screen (option setting screen) that allows the player to set the game play environment.

In FIG. 19A, the player can set "stereoscopic method", "stereoscopic level", "television size", "distance from television", and the like as stereoscopic options of the game environment settings. The player can set a polarized method using polarized glasses, a shutter method using a liquid crystal shutter, or the like as the stereoscopic method.

The stereoscopic level corresponds to the inter-camera distance DS. The player can observe a stereoscopic image with the desired stereoscopic effect by arbitrarily setting the stereoscopic level.

The television size is the size of a television (display section) on which a stereoscopic image is displayed. The distance from the television is the distance between the player and the television. When the television size or the distance from the television is changed, the stereoscopic effect observed by the player differs even if the inter-camera distance is the same. Therefore, it is desirable to correct the inter-camera distance depending on the television size or the distance from the television.

In FIG. 19B, an upper-limit value, a reference value, and a lower-limit value can be set as the stereoscopic level. The upper-limit value, the reference value, and the lower-limit value respectively correspond to the upper-limit distance DSH, the reference distance DSR, and the lower-limit distance DSL described with reference to FIG. 17B. The allowable change range of the inter-camera distance DS is set using the upper-limit distance DSH corresponding to the upper-limit value of the stereoscopic level and the lower-limit distance DSL corresponding to the lower-limit value of the stereoscopic level.

In this embodiment, the inter-camera distance DS is set based on at least one of the allowable change range (DSH-DSL) and the reference distance DSR of the inter-camera distance DS that have been set using the game environment setting screen shown in FIG. 19B. For example, the inter-camera distance DS is controlled so that the inter-camera distance DS changes within the allowable change range set using the game environment setting screen.

In FIGS. 17A and 17B, the inter-camera distance DS is controlled so that the inter-camera distance DS approaches the reference distance DSR that has been set by the player using the game environment setting screen with the passage of time. In this case, the inter-camera distance DS is controlled so that the inter-camera distance DS falls within the allowable change range set using the upper-limit distance DSH and the lower-limit distance DSL (see FIG. 17B). In FIG. 15B, the inter-camera distance DS is changed using the change function that is based on the reference distance DSR that has been set using the game environment setting screen. The inter-camera distance DS is controlled so that the amplitude of the change function of the inter-camera distance DS falls within the allowable change range set using the upper-limit distance DSH and the lower-limit distance DSL. When controlling the inter-camera distance DS as shown in FIGS. 3C, 5B, 7, 9B, 9C, and the like, the inter-camera distance DS is similarly brought closer to the reference distance DSR, or the inter-camera distance DS is controlled so that the inter-camera distance DS falls within the allowable change range.

This makes it possible to change the inter-camera distance while reflecting the player's (user's) will to a certain extent. Specifically, the player can arbitrarily determine the reference value and the range of the stereoscopic level. This makes it possible to set the inter-camera distance depending on the game situation while absorbing a difference between players, so that a novel stereoscopic interface environment can be provided.

When DSL=0.7, DSR=1.2, and DSH=1.5 in FIG. 19B, the reference distance is set to 1.2, and the inter-camera distance is changed within the range of 0.7 to 1.5. When DSL=DSR=DSH, a stereoscopic image based on a fixed inter-camera distance may be generated.

Figure 20:
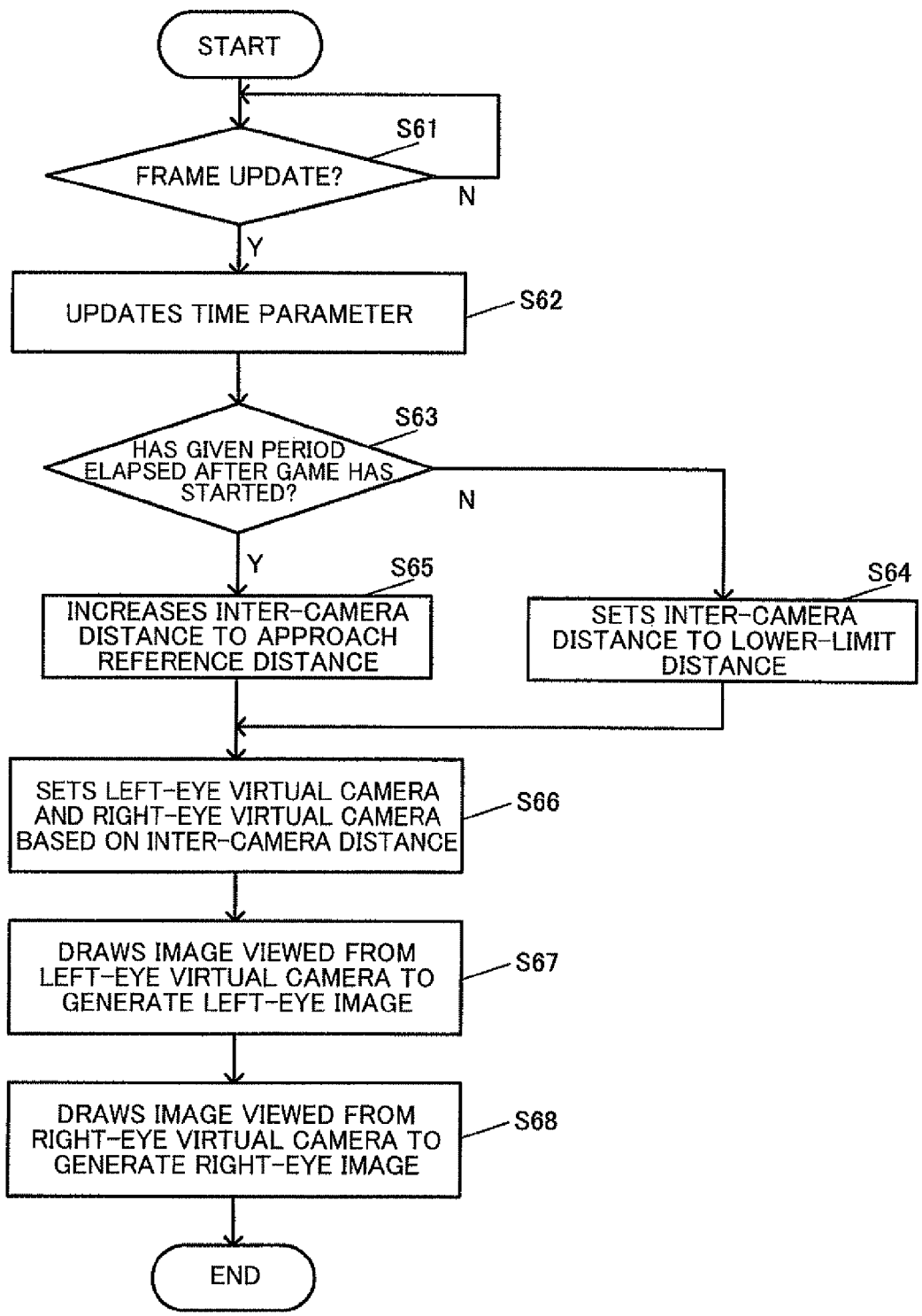
FIG. 20 is a flowchart showing a process that sets an inter-camera distance based on a time parameter.

An example of a process that sets the inter-camera distance based on the time parameter is described below using a flowchart shown in FIG. 20.

Whether or not a frame update timing has been reached is determined (step S61). When the frame update timing has been reached, the time parameter is updated (step S62). For example, the frame update count that indicates the elapsed time is incremented by one.

Whether or not a given period (TIN) has elapsed after the game has started is then determined (see FIG. 17B) (step S63). When the given period has not elapsed, the inter-camera distance is set to the lower-limit distance (DSL) (step S64). When the given period has elapsed, the inter-camera distance is increased to approach the reference distance (DSR) (step S65).

The left-eye virtual camera and the right-eye virtual camera are set based on the inter-camera distance to generate a left-eye image and a right-eye image (steps S66 to S68).

Although some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention. Any term cited with a different term having a broader meaning or the same meaning at least once in the specification and the drawings can be replaced by the different term in any place in the specification and the drawings. The inter-camera distance setting process, the time parameter calculation process, and the like are not limited to those described in connection with the above embodiments. Methods equivalent to those described in connection with the above embodiments are included within the scope of the invention. The invention may be applied to various games. The invention may be applied to various image generation systems such as an arcade game system, a consumer game system, a large-scale attraction system in which a number of players participate, a simulator, a multimedia terminal, a system board that generates a game image, and a mobile phone.

What is claimed is:

1. An image generation system including a processor, comprising:
   an object space setting section that sets an object space where a plurality of objects are disposed;
   a character control section that controls a character that moves in the object space;
   a virtual camera control section that controls a virtual camera;
   an inter-camera distance setting section that sets an inter-camera distance based on at least one of position information, direction information, and moving state information about the character or the virtual camera, the inter-camera distance being a distance between a left-eye virtual camera and a right-eye virtual camera for generating a stereoscopic image, the inter-camera distance setting section changing the inter-camera distance by repeatedly increasing and reducing the inter-camera distance when a given event has been generated in connection with the character; and
   an image generation section that generates a left-eye image and a right-eye image, the left-eye image being an image viewed from the left-eye virtual camera in the object space, and the right-eye image being an image viewed from the right-eye virtual camera in the object space.

2. An image generation system including a processor, comprising:
   an object space setting section that sets an object space where a plurality of objects are disposed;
   a character control section that controls a character that moves in the object space;
   a virtual camera control section that controls a virtual camera;
   an inter-camera distance setting section that sets an inter-camera distance based on at least one of position information, direction information, and moving state information about the character or the virtual camera, the inter-camera distance being a distance between a left-eye virtual camera and a right-eye virtual camera for generating a stereoscopic image, the inter-camera distance setting section acquiring map information about a place where the character or the virtual camera is positioned based on the position information about the character or the virtual camera, and setting the inter-camera distance based on the acquired map information; and
   an image generation section that generates a left-eye image and a right-eye image, the left-eye image being an image viewed from the left-eye virtual camera in the object space, and the right-eye image being an image viewed from the right-eye virtual camera in the object space.

3. The image generation system as defined in claim 2,
   the inter-camera distance setting section increasing the inter-camera distance when it has been determined that the character or the virtual camera is positioned at a high place based on the map information, and reducing the inter-camera distance when it has been determined that the character or the virtual camera is positioned at a low place based on the map information.

4. The image generation system as defined in claim 2,
   the inter-camera distance setting section setting the inter-camera distance based on the type of accessory object attached to the character.

5. The image generation system as defined in claim 2,
   the inter-camera distance setting section setting the inter-camera distance based on a motion of the character.

6. An image generation system including a processor, comprising:
   an object space setting section that sets an object space where a plurality of objects are disposed;
   a character control section that controls a character that moves in the object space;
   a virtual camera control section that controls a virtual camera;
   an inter-camera distance setting section setting an inter-camera distance based on at least one of direction information and moving direction information about a target object that is targeted by the character during a game, the inter-camera distance setting section setting the inter-camera distance to be a different distance depending on direction information or moving direction information about the character or the virtual camera, the inter-camera distance being a distance between a left-eye virtual camera and a right-eye virtual camera for generating a stereoscopic image;
   an image generation section that generates a left-eye image and a right-eye image, the left-eye image being an image viewed from the left-eye virtual camera in the object space, and the right-eye image being an image viewed from the right-eye virtual camera in the object space.

7. The image generation system as defined in claim 6,
   the inter-camera distance setting section changing the inter-camera distance when it has been determined that a direction of the character or the virtual camera has approximately coincided with a direction where the target object is positioned.

8. The image generation system as defined in claim 7,
   the inter-camera distance setting section increasing the inter-camera distance when it has been determined that the target object is positioned at a long distance away from the character or the virtual camera, and reducing the inter-camera distance when it has been determined that the target object is positioned at a short distance away from the character or the virtual camera.

9. The image generation system as defined in claim 6,
   the inter-camera distance setting section setting the inter-camera distance based on the type of accessory object attached to the character.

10. The image generation system as defined in claim 6,
    the inter-camera distance setting section setting the inter-camera distance based on a motion of the character.

11. The image generation system as defined in claim 6,
    the inter-camera distance setting section changing the inter-camera distance as a direction of the character becomes parallel to a direction of the target object.

12. The image generation system as defined in claim 6,
    the inter-camera distance setting section reducing the inter-camera distance when it has been determined that a moving path of the target object is extending toward the character, or when it has been determined that a moving path of the character is extending toward the target object.

13. An image generation method comprising:
   setting an object space where a plurality of objects are disposed;
   controlling a character that moves in the object space;
   controlling a virtual camera;
   setting an inter-camera distance using a processor based on at least one of position information, direction information and moving state information about the character or the virtual camera, the inter-camera distance being a distance between a left-eye virtual camera and a right-eye virtual camera for generating a stereoscopic image;
   generating a left-eye image and a right-eye image, the left-eye image being an image viewed from the left-eye virtual camera in the object space, and the right-eye image being an image viewed from the right-eye virtual camera in the object space; and
   changing the inter-camera distance by repeatedly increasing and reducing the inter-camera distance when a given event has been generated in connection with the character.

14. An image generation method comprising:
   setting an object space where a plurality of objects are disposed;
   controlling a character that moves in the object space;
   controlling a virtual camera;
   setting an inter-camera distance using a processor based on at least one of position information, direction information and moving state information about the character or the virtual camera, the inter-camera distance being a distance between a left-eye virtual camera and a right-eye virtual camera for generating a stereoscopic image;
   generating a left-eye image and a right-eye image, the left-eye image being an image viewed from the left-eye virtual camera in the object space, and the right-eye image being an image viewed from the right-eye virtual camera in the object space; and
   acquiring map information about a place where the character or the virtual camera is positioned based on the position information about the character or the virtual camera, and setting the inter-camera distance based on the acquired map information.

15. The image generation method of claim 14, further comprising:
   increasing the inter-camera distance when it has been determined that the character or the virtual camera is positioned at a high place based on the map information, and reducing the inter-camera distance when it has been determined that the character or the virtual camera is positioned at a low place based on the map information.

16. An image generation method comprising:
   setting an object space where a plurality of objects are disposed;
   controlling a character that moves in the object space;
   controlling a virtual camera;
   setting an inter-camera distance using a processor based on at least one of direction information and moving direction information about a target object that is targeted by the character during a game, the inter-camera distance being a different distance depending on direction information or moving direction information about the character or the virtual camera, the inter-camera distance being a distance between a left-eye virtual camera and a right-eye virtual camera for generating a stereoscopic image;
   generating a left-eye image and a right-eye image, the left-eye image being an image viewed from the left-eye virtual camera in the object space, and the right-eye image being an image viewed from the right-eye virtual camera in the object space.

17. The image generation method of claim 16, further comprising:
   changing the inter-camera distance when it has been determined that a direction of the character or the virtual camera has approximately coincided with a direction where the target object is positioned.

18. The image generation method of claim 17, further comprising:
   increasing the inter-camera distance when it has been determined that the target object is positioned at a long distance away from the character or the virtual camera, and reducing the inter-camera distance when it has been determined that the target object is positioned at a short distance away from the character or the virtual camera.

19. The image generation method of claim 16, further comprising:
   changing the inter-camera distance as a direction of the character becomes parallel to a direction of the target object.

20. The image generation method of claim 16, further comprising:
   reducing the inter-camera distance when it has been determined that a moving path of the target object is extending toward the character, or when it has been determined that a moving path of the character is extending toward the target object.

* * * * *